United States Patent
Bae et al.

(10) Patent No.: US 10,680,758 B2
(45) Date of Patent: Jun. 9, 2020

(54) METHOD AND DEVICE FOR OPERATION OF USER EQUIPMENT AND BASE STATION IN WIRELESS COMMUNICATION SYSTEM

(71) Applicant: LG Electronics Inc., Seoul (KR)

(72) Inventors: Duckhyun Bae, Seoul (KR); Yunjung Yi, Seoul (KR); Daesung Hwang, Seoul (KR); Inkwon Seo, Seoul (KR); Changhwan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/065,718

(22) PCT Filed: Mar. 16, 2018

(86) PCT No.: PCT/KR2018/003095
§ 371 (c)(1),
(2) Date: Sep. 20, 2018

(87) PCT Pub. No.: WO2018/169347
PCT Pub. Date: Sep. 20, 2018

(65) Prior Publication Data
US 2019/0393988 A1 Dec. 26, 2019

Related U.S. Application Data

(60) Provisional application No. 62/472,557, filed on Mar. 16, 2017, provisional application No. 62/480,547, (Continued)

(51) Int. Cl.
*H04L 1/08* (2006.01)
*H04L 1/18* (2006.01)
*H04W 72/04* (2009.01)

(52) U.S. Cl.
CPC .............. *H04L 1/08* (2013.01); *H04L 1/1812* (2013.01); *H04W 72/0446* (2013.01)

(58) Field of Classification Search
None
See application file for complete search history.

(56) References Cited

U.S. PATENT DOCUMENTS

2010/0115360 A1   5/2010   Seok et al.
2011/0250892 A1*  10/2011  Gupta ............... H04W 36/0011
                                                          455/437
(Continued)

FOREIGN PATENT DOCUMENTS

EP   1919245   5/2008
JP   5977398   8/2016
(Continued)

OTHER PUBLICATIONS

International Search Report in International Application No. PCT/KR2018/003095, dated Jun. 27, 2018, 14 pages (with partial English Translation).

(Continued)

*Primary Examiner* — Mohammad S Adhami
(74) *Attorney, Agent, or Firm* — Fish & Richardson P.C.

(57) ABSTRACT

The present invention discloses methods for operating a user equipment and a base station in a wireless communication system and devices for supporting the same. More specifically, the present invention provides various embodiments of methods by which a user equipment transmits an uplink signal to a base station and receives feedback information on the uplink signal in order to transmit and receive signals to and from the base station.

19 Claims, 16 Drawing Sheets

Related U.S. Application Data filed on Apr. 3, 2017, provisional application No. 62/492,910, filed on May 1, 2017, provisional application No. 62/525,758, filed on Jun. 28, 2017, provisional application No. 62/536,993, filed on Jul. 26, 2017, provisional application No. 62/556,492, filed on Sep. 10, 2017.

(56) References Cited

U.S. PATENT DOCUMENTS

| 2014/0254544 | A1  | 9/2014 | Au et al. | |
|---|---|---|---|---|
| 2016/0219627 | A1  | 7/2016 | Au et al. | |
| 2018/0123765 | A1* | 5/2018 | Cao | H04L 1/1893 |
| 2018/0219649 | A1* | 8/2018 | Ying | H04L 1/1816 |
| 2018/0270799 | A1* | 9/2018 | Noh | H04L 27/261 |
| 2019/0230630 | A1* | 7/2019 | Mu | H04L 1/0003 |

FOREIGN PATENT DOCUMENTS

| KR | 10-2010-0058398 | 6/2010 |
|---|---|---|
| KR | 10-1232567 | 2/2013 |
| KR | 10-2014-0125705 | 10/2014 |
| KR | 10-2015-0093841 | 8/2015 |
| WO | 2017/016425 | 2/2017 |
| WO | 2017/039564 | 3/2017 |

OTHER PUBLICATIONS

Ericsson, "On UL grant-free transmission," 3GPP TSG-RAN WG1 #88, dated Feb. 13-17, 2017, 2 pages.
Lenovo, Motorola Mobility, "HARQ design for UL grant-free URLLC transmission," 3GPP TSG RAN WG1 Meeting #88, dated Feb. 13-17, 2017, 3 pages.
Samsung, "Grant-free based multiple access," 3GPP TSG RAN WG1 NR Ad Hoc, dated Jan. 16-20, 2017, 4 pages.
Japanese Office Action in Japanese Application No. 2019-503417, dated Oct. 1, 2019, 9 pages (with English translation).
Huawei, HiSilicon, "Discussion on type 1 grant-free for connected mode UE," R2-1709264, 3GPP TSG-RAN WG2 Meeting #99, Berlin, Germany, Aug. 21-25, 2017, 4 pages.
Nokia, Nokia Shanghai Bell, "On remaining issues for UL transmission without grant," R1-1720481, 3GPP TSG-RAN WG1 Meeting 91, Reno, USA, Nov. 27-Dec. 1, 2017, 4 pages.
3rd Generation Partnership Project; Technical Specification Group Radio Access Network; NR, "Physical layer procedures for data (Release 15)," 3GPP TS 38.214 V1.3.0, Dec. 2017, 146 pages, R1-1721344 (with original document).
ZTE, Sanechips, "Remaining details of UL transmission without grant," R1-1717442, 3GPP TSG RAN WG1 Meeting 90bis, Prague, CZ, Oct. 9-13, 2017, 8 pages.
Huawei, HiSilicon, "On the determination of UE ID and HARQ process for UL grant-free transmission," R1-1712215, 3GPP TSG RAN WG1 Meeting #90, Prague, Czech Republic, Aug. 21-25, 2017, 6 pages.

* cited by examiner

FIG. 11

| R1 | R2 | R3 | R1 | R2 | R3 | R1 | R2 | R3 |
|----|----|----|----|----|----|----|----|----|
| H1 | | | H2 | | | H3 | | |

FIG. 12

| R1 | R2 | R1 | R2 | R1 | R2 | R3 | R3 | R3 |
|----|----|----|----|----|----|----|----|----|
| H1 | | H2 | | H3 | | H1 | H2 | H3 |

| Resource pool | | | | | | | | |
|---|---|---|---|---|---|---|---|---|
| K = 2 | R1 | R2 | R1 | R2 | R1 | R2 | R1 | R2 |
| K = 4 | R1 | R2 | R3 | R4 | R1 | R2 | R3 | R4 |
| K = 8 | R1 | R2 | R3 | R4 | R5 | R6 | R7 | R8 |

METHOD AND DEVICE FOR OPERATION OF USER EQUIPMENT AND BASE STATION IN WIRELESS COMMUNICATION SYSTEM

CROSS-REFERENCE TO RELATED APPLICATIONS

This application is a National Stage application under 35 U.S.C. § 371 of International Application No. PCT/KR2018/003095, filed on Mar. 16, 2018, which claims the benefit of U.S. Provisional Application No. 62/556,492, filed on Sep. 10, 2017, U.S. Provisional Application No. 62/536,993, filed on Jul. 26, 2017, U.S. Provisional Application No. 62/525,758, filed on Jun. 28, 2017, U.S. Provisional Application No. 62/492,910, filed on May 1, 2017, U.S. Provisional Application No. 62/480,547, filed on Apr. 3, 2017, and U.S. Provisional Application No. 62/472,557, filed on Mar. 16, 2017. The disclosures of the prior applications are incorporated by reference in their entirety.

TECHNICAL FIELD

The present invention relates to a wireless communication system, and more particularly, to methods for operating a user equipment and a base station in a wireless communication system and devices for supporting the same.

More specifically, the present invention provides various embodiments of methods by which a user equipment transmits an uplink signal to a base station and receives feedback information on the uplink signal in order to transmit and receive signals to and from the base station.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE OF THE INVENTION

Technical Task

An object of the present invention is to provide methods for operating a user equipment and a base station in a wireless communication system and devices for supporting the same.

Another object of the present invention is to provide methods for operating a user equipment and a base station when the base station configures grant-free uplink transmission for the user equipment.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides operating methods for a user equipment and a base station and devices therefor.

In an aspect of the present invention, provided herein is a method for operating a User Equipment (UE) with respect to a Base Station (BS) in a wireless communication system. The method may include, when grant-free uplink transmission is configured by the BS, repeatedly transmitting an uplink signal one or more times on resources configured by the BS within a predetermined time. In this case, the uplink signal repeatedly transmitted one or more times within the predetermined time may correspond to the same Hybrid Automatic Repeat reQuest (HARQ) process identity (ID).

In another aspect of the present invention, provided herein is a User Equipment (UE) for transmitting and receiving signals to and from a Base Station (BS) in a wireless communication system. The UE may include: a transmitter; a receiver; and a processor connected to the transmitter and the receiver. The processor may be configured to repeatedly transmit an uplink signal one or more times on resources configured by the BS within a predetermined time when grant-free uplink transmission is configured by the BS. In addition, the uplink signal repeatedly transmitted one or more times within the predetermined time may correspond to the same Hybrid Automatic Repeat reQuest (HARQ) process identity (ID).

In the above configuration, when the number of repetitions is set to K (where K is a natural number equal to or greater than 1) for the UE, the UE may repeat the transmission K times within the predetermined time, or if the predetermined period expires, the UE terminates repeating the transmission.

In addition, the UE may obtain acknowledgement information for the uplink signal.

In this case, the UE may obtain the acknowledgement information for the uplink signal as follows: if the UE receives acknowledgement information corresponding to the HARQ process ID from the BS, the UE obtains Non-ACKnowledgement (NACK) for the uplink signal; and if the UE does not receive the acknowledgement information corresponding to the HARQ process ID from the BS, the UE obtains ACKnowledgement (ACK) for the UL signal.

When the UE obtains the NACK for the uplink signal, the UE may perform retransmission of the uplink signal.

Alternatively, the acknowledgement information may be indicated by combining either or both of: (1) information indicating a specific value as resource allocation information for the UE; and (2) feedback information using an HARQ process which is not currently used.

In addition, the HARQ process ID may be determined based on a resource on which initial transmission of the repeated transmission is performed.

Moreover, a redundancy version corresponding to the repeatedly transmitted uplink signal varies depending on a pattern that is determined based on the resources allocated to the UE.

In a still another aspect of the present invention, provided herein is a method for operating a Base Station (BS) with respect to a User Equipment (UE) in a wireless communication system. The method may include, when grant-free uplink transmission is configured for the UE, receiving, from the UE, an uplink signal one or more times on resources configured by the BS within a predetermined period. In this case, the uplink signal received one or more times within the predetermined time may correspond to the same Hybrid Automatic Repeat reQuest (HARQ) process identity (ID).

In a further aspect of the present invention, provided herein is a Base Station (BS) for transmitting and receiving signals to and from a User Equipment (UE) in a wireless communication system. The BS may include: a transmitter; a receiver; and a processor connected to the transmitter and the receiver. In this case, the processor may be configured to receive, from the UE, an uplink signal one or more times on resources configured by the BS within a predetermined period when grant-free uplink transmission is configured for the UE. In addition, the uplink signal received one or more times within the predetermined time may correspond to the same Hybrid Automatic Repeat reQuest (HARQ) process identity (ID).

In the above configuration, when the number of repetitions is set to K (where K is a natural number equal to or greater than 1) for the UE, the BS may receive the uplink signal one or more times but K or less times depending on how the UE repeats transmission within the predetermined time.

In addition, the BS may either transmit acknowledgement information corresponding to the HARQ process ID to the UE or discard the transmission according to whether the received uplink signal is successfully decoded. In this case, the acknowledgement information may correspond to Non-ACKnowledgement (NACK) for the uplink signal.

Moreover, when the BS transmits the acknowledgement information, the BS may receive a signal retransmitted for the uplink signal from the UE.

Further, the BS may transmit acknowledgement information corresponding to the HARQ process ID to the UE according to whether the received uplink signal is successfully decoded. In this case, the acknowledgement information may indicated by combining either or both of: (1) information indicating a specific value as resource allocation information for the UE; and (2) feedback information using an HARQ process which is not currently used.

Additionally, the HARQ process ID may be determined based on a resource on which the UE performs initial transmission of repeated transmission.

In this case, the resource on which the initial transmission is performed may be determined based on a specific resource index in a section including reception of the initial transmission and the repeated transmission.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present invention, a UE and a BS can recognize an HARQ process ID for grant-free signal transmission.

In addition, it is possible to prevent a mismatch from occurring between a UE and a BS when they interpret feedback on grant-free signal transmission.

Moreover, according to the configurations proposed in the present invention, when a UE performs transmission for the same Transmission (or Transport) Block (TB) one or more times, efficient HARQ combining can be achieved by using the proposed methods, whereby reducing the signaling overhead caused by transmission feedback. In particular, according to the configurations proposed in the present invention, when a UE performs grant-free uplink transmission by using contention-based uplink resources, the collision probability between UEs can be reduced.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIGS. 11 and 12 schematically illustrate relationships between HARQ process IDs (or HARQ process numbers) and periodically allocated resources according to an embodiment of the present invention.

BEST MODE FOR INVENTION

Figure 1:
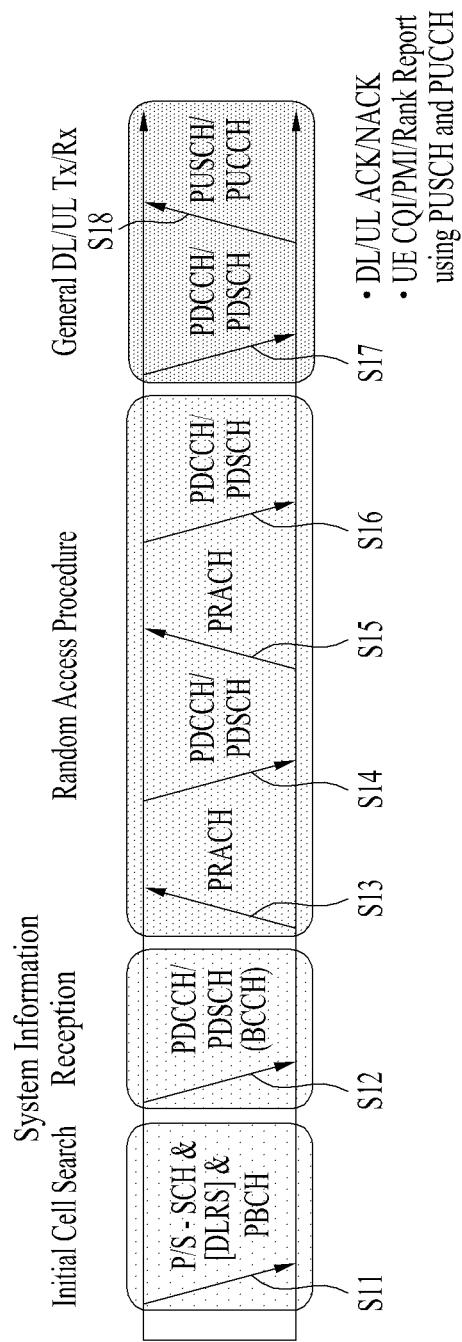
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system, and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
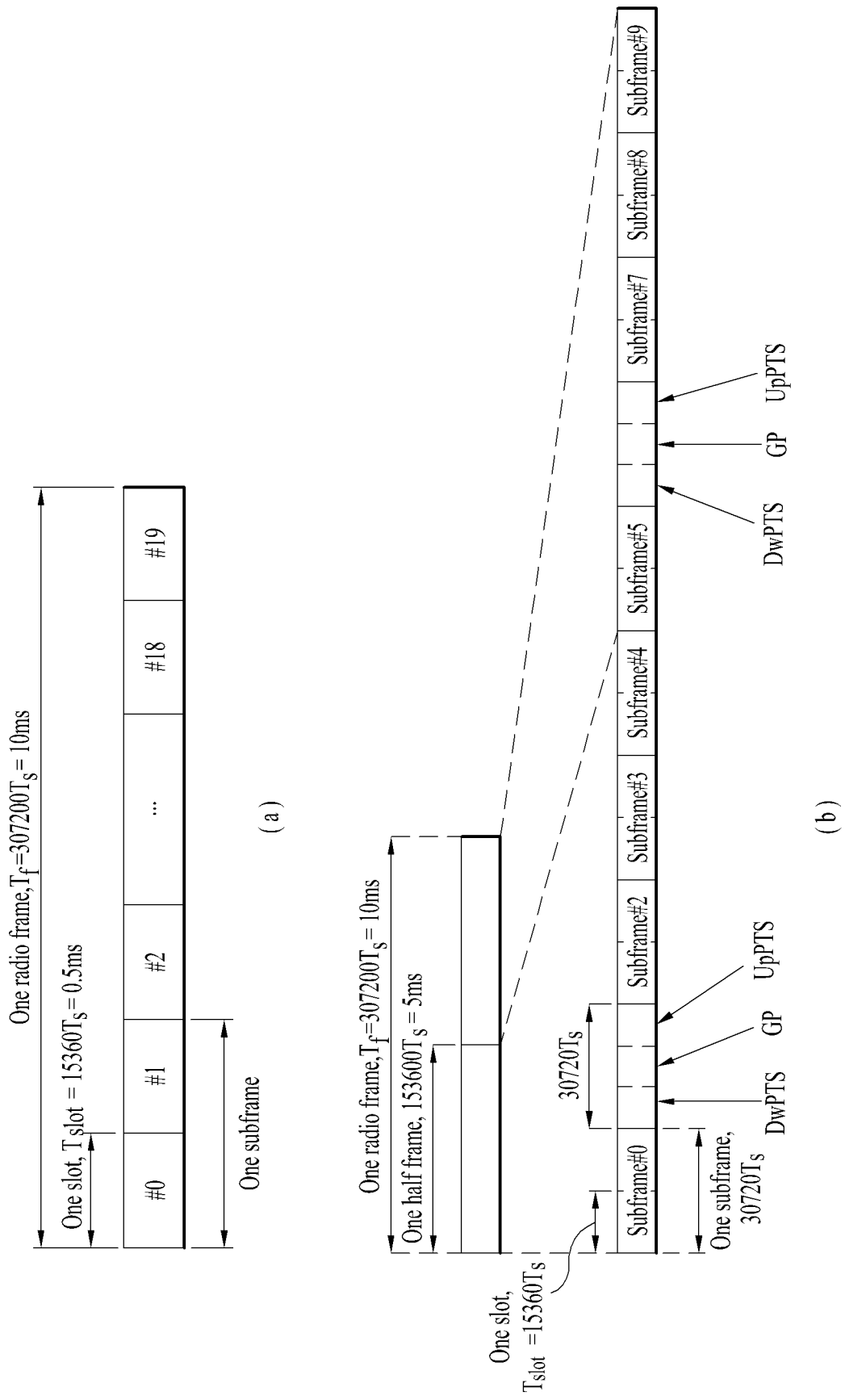
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In addition, in the LTE Rel-13 system, it is possible to newly configure the configuration of special subframes (i.e., the lengths of DwPTS/GP/UpPTS) by considering the number of additional SC-FDMA symbols, X, which is provided by the higher layer parameter named "srs-UpPtsAdd" (if this parameter is not configured, X is set to 0). In the LTE Rel-14 system, specific subframe configuration #10 is newly added. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.)

Figure 4:
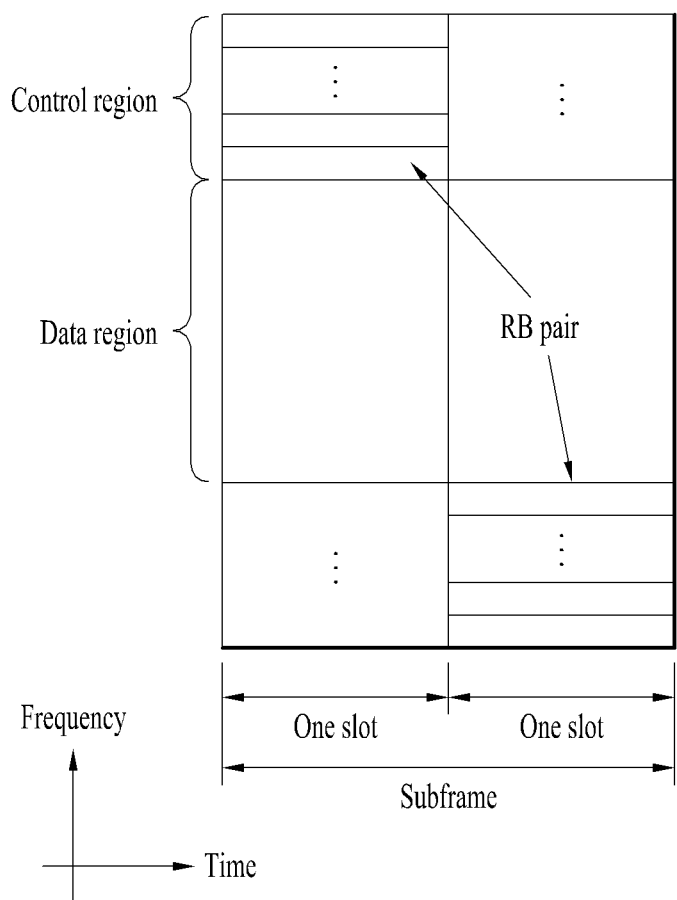
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
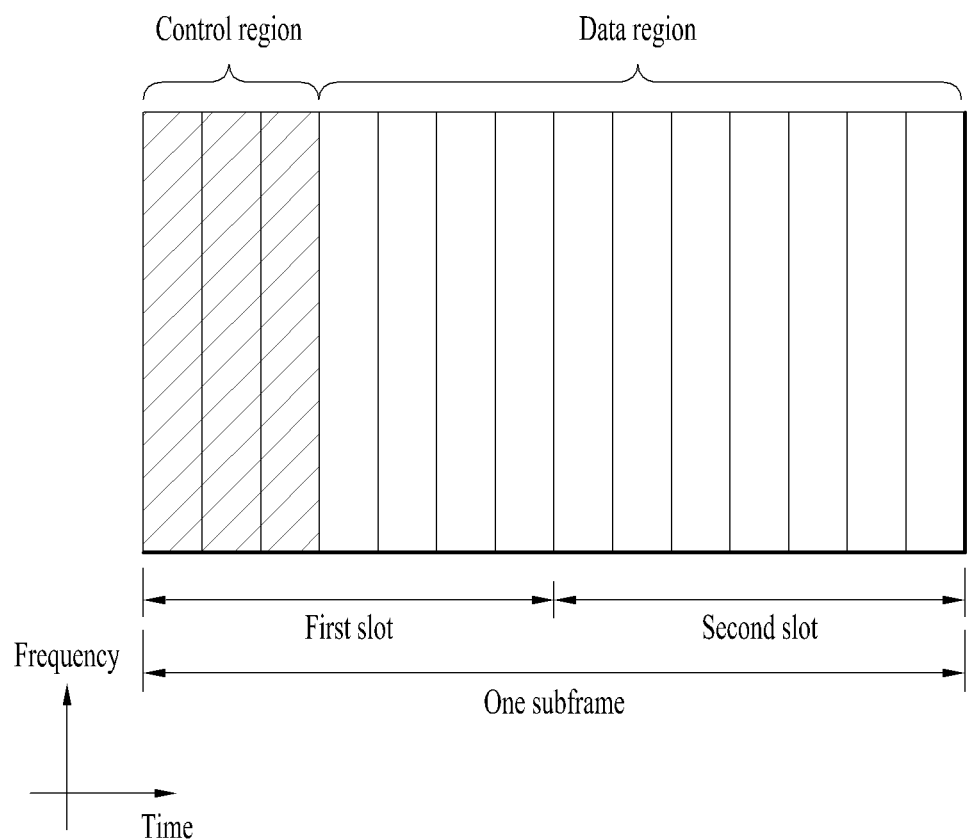
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Figure 3:
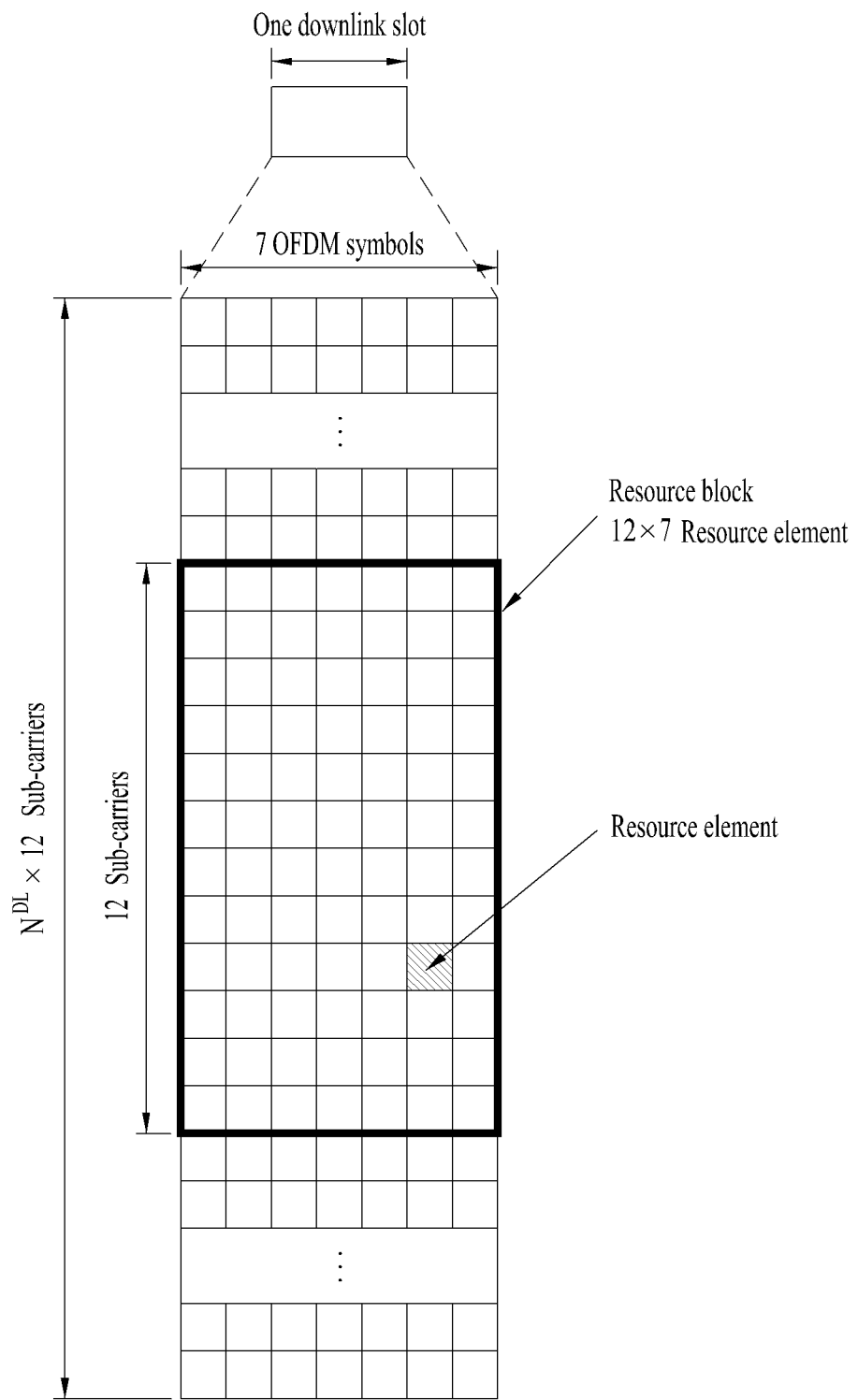
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present invention, the corresponding technology is referred to as the new RAT or new radio (NR) for convenience of description.

2.1. Numerologies

The NR system to which the present invention is applicable supports various OFDM numerologies shown in the following table. In this case, the value of μ and cyclic prefix information per carrier bandwidth part can be signaled in DL and UL, respectively. For example, the value of μ and cyclic prefix information per downlink carrier bandwidth part may be signaled though DL-BWP-mu and DL-MWP-cp corresponding to higher layer signaling. As another example, the value of μ and cyclic prefix information per uplink carrier bandwidth part may be signaled though UL-BWP-mu and UL-MWP-cp corresponding to higher layer signaling.

TABLE 3

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^\mu \in \{0, \ldots, N_{slot}^{subframe,\mu}-1\}$ and may also be numbered within a frame in ascending order like $n_{s,f}^\mu \in \{0, \ldots, N_{slot}^{subframe,\mu}-1\}$. In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the NR system to which the present invention can be applied, a self-contained slot structure can be applied based on the above-described slot structure.

Figure 6:
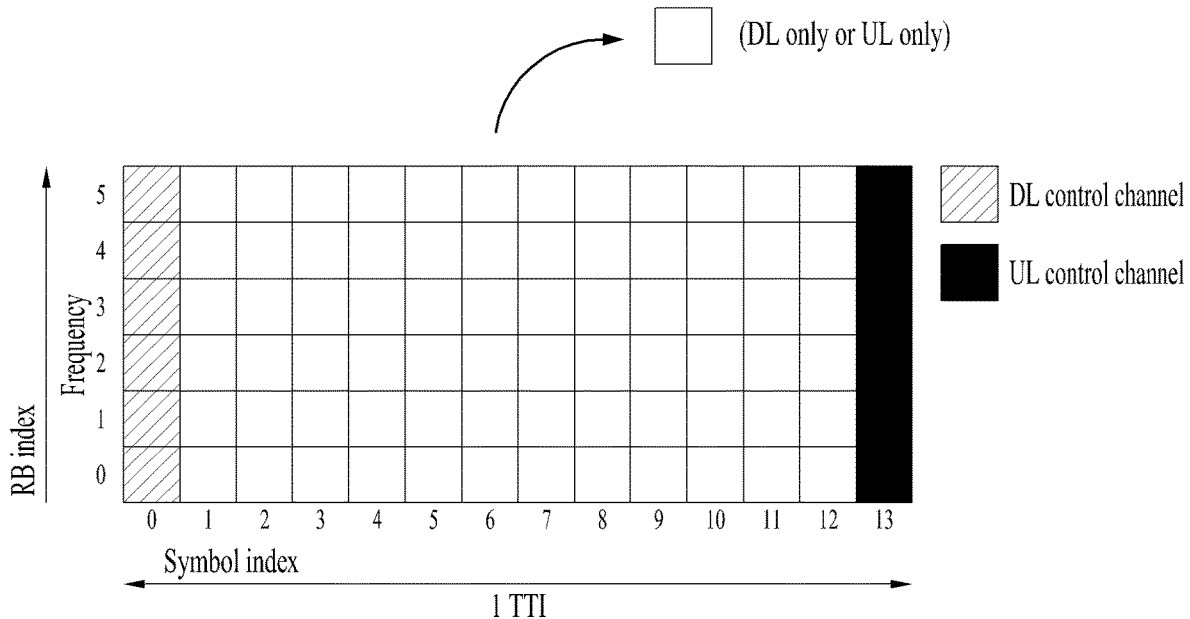
FIG. 6 is a diagram illustrating a self-contained subframe structure applicable to the present invention.

FIG. 6 is a diagram illustrating a self-contained slot structure applicable to the present invention.

In FIG. 6, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the eNB and UE can sequentially perform DL transmission and UL transmission in one slot. That is, the eNB and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present invention may include either the DL control region or the UL control region as well as both the DL and UL control regions as shown in FIG. 6.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
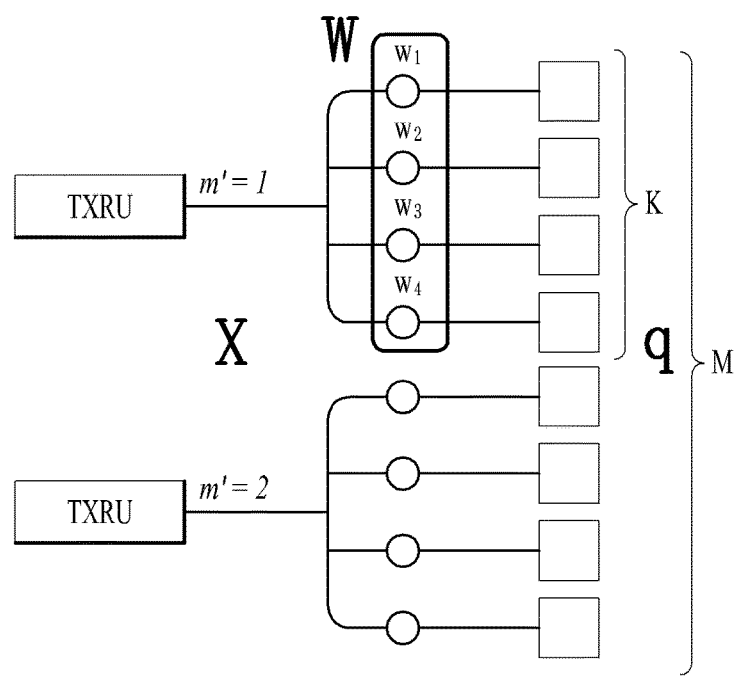
FIGS. 7 and 8 are diagrams illustrating representative connection methods for connecting TXRUs to antenna elements.
Figure 8:
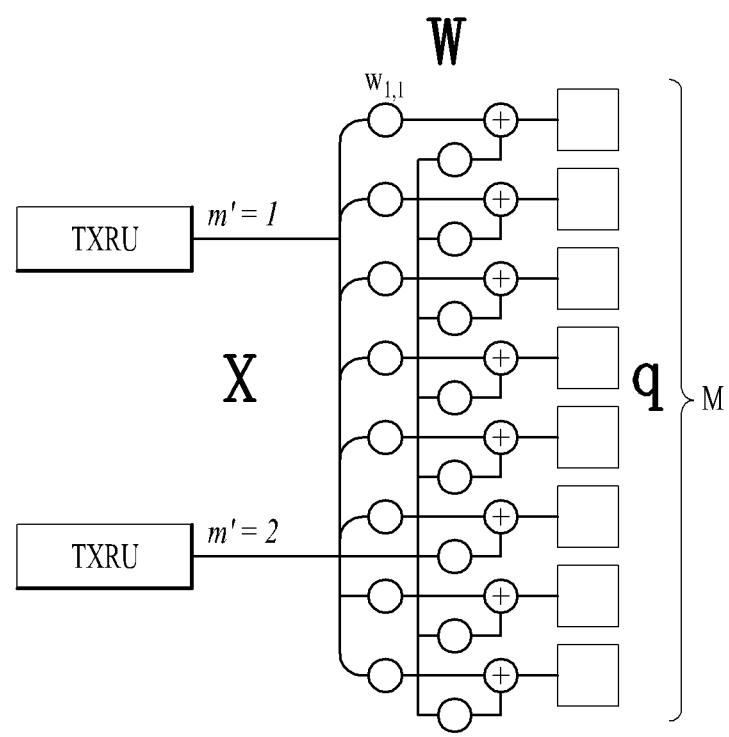

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to subarrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas are used in the NR system to which the present invention is applicable, the hybrid beamforming method obtained by combining the digital beamforming and analog beamforming can be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 9:
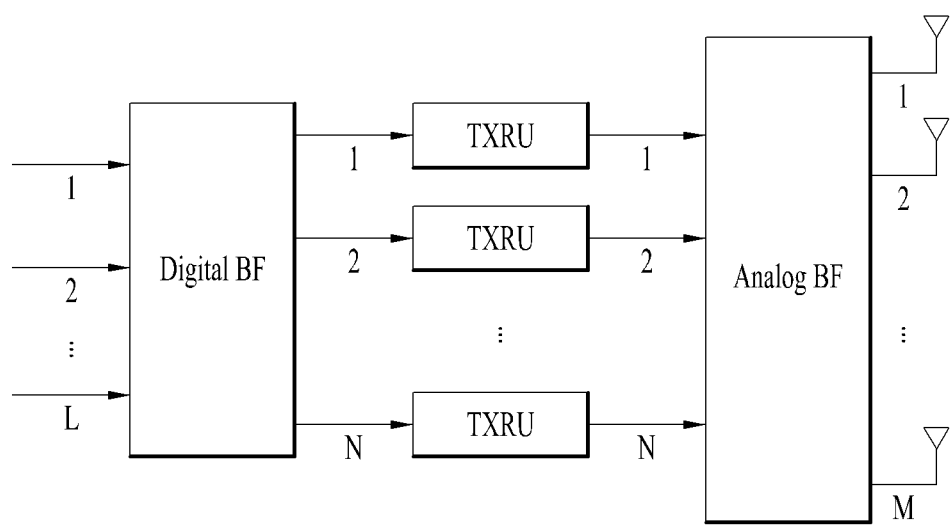
FIG. 9 is a schematic diagram illustrating a hybrid beamforming structure according to an embodiment of the present invention from the perspective of TXRUs and physical antennas.

FIG. 9 is a schematic diagram illustrating a hybrid beamforming structure according to an embodiment of the present invention from the perspective of TXRUs and physical antennas. In FIG. 9, it is assumed that the number of digital beams is L and the number of analog beams is N.

Additionally, a method for providing efficient beamforming to UEs located in a specific area by designing an eNB capable of changing analog beamforming on a symbol basis has been considered in the NR system to which the present invention is applicable. Further, a method of introducing a plurality of antenna panels where independent hybrid beamforming can be applied by defining N TXRUs and M RF antennas as one antenna panel has also been considered in the NR system to which the present invention is applicable.

When the eNB uses a plurality of analog beams as described above, each UE has a different analog beam suitable for signal reception. Thus, the beam sweeping operation where the eNB applies a different analog beam per symbol in a specific subframe (SF) (at least with respect to synchronization signals, system information, paging, etc.) and then perform signal transmission in order to allow all UEs to have reception opportunities has been considered in the NR system to which the present invention is applicable.

Figure 10:
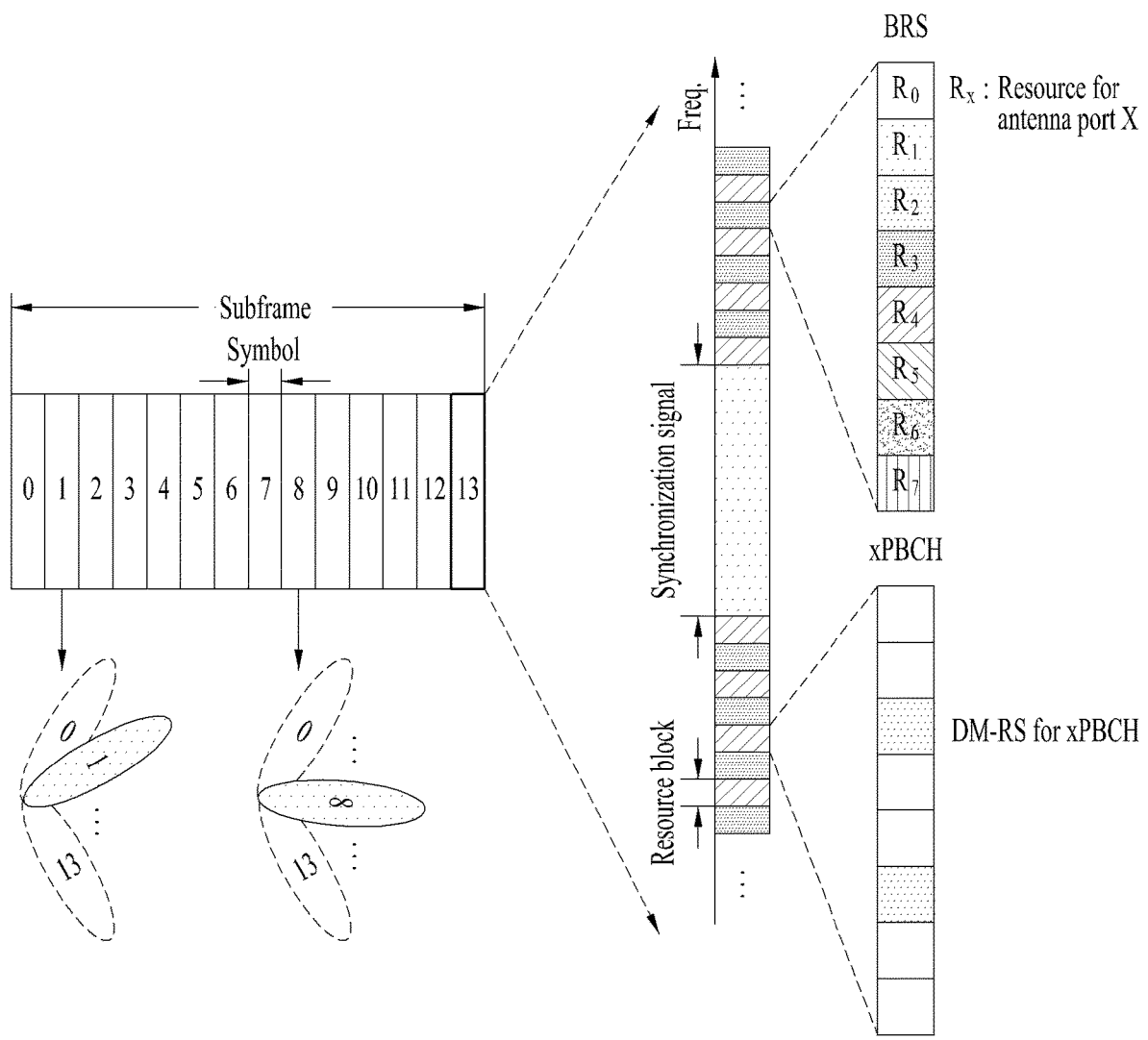
FIG. 10 is a diagram schematically illustrating the beam sweeping operation for synchronization signals and system information during a downlink (DL) transmission process according to an embodiment of the present invention.

FIG. 10 is a diagram schematically illustrating the beam sweeping operation for synchronization signals and system information during a downlink (DL) transmission process according to an embodiment of the present invention In FIG. 10, a physical resource (or channel) for transmitting system information of the NR system to which the present invention is applicable in a broadcasting manner is referred to as a physical broadcast channel (xPBCH). In this case, analog beams belonging to different antenna panels can be simultaneously transmitted in one symbol.

In addition, the introduction of a beam reference signal (BRS) corresponding to the reference signal (RS) to which a single analog beam (corresponding to a specific antenna panel) is applied has been discussed as the configuration for measuring a channel per analog beam in the NR system to which the present invention is applicable. The BRS can be defined for a plurality of antenna ports, and each BRS antenna port may correspond to a single analog beam. In this case, unlike the BRS, all analog beams in the analog beam group can be applied to the synchronization signal or xPBCH to assist a random UE to correctly receive the synchronization signal or xPBCH.

3. Proposed Embodiments

Hereinafter, the configurations proposed in the present invention will be described in detail based on the above-discussed technical features.

In a wireless communication system to which the present invention is applicable, a UE can perform grant-free UL signal transmission without scheduling from a BS. Hereinafter, for clarity of description, UL signal transmission that can be performed without separate scheduling from a BS is referred to as grant-free UL signal transmission.

In the NR system to which the present invention is applicable, the following two types of scheduling methods for grant-free UL signal transmission can be used.

Type 1 (configured grant Type 1): UL grant is provided by higher layer signaling (e.g., RRC) and stored as configured UL grant.

Type 2 (configured grant Type 2): UL grant is provided by L1 signaling (e.g., PDCCH) and stored or cleared as configured UL grant based on L1 signaling indicating configured grant activation or deactivation.

In this case, for efficient use of resources, the UE can use a resource pool that is shared by multiple UEs for the UL transmission in a contention-based manner.

However, it is difficult for the BS to accurately recognize the identity (e.g., identifier) of a UE who attempts to transmit a signal by using contention-based resources, and thus it is also difficult for the BS to transmit UE-specific feedback in response to the signal. To solve this problem, the BS can use a resource-specific A/N channel instead of a UE-specific A/N channel.

In addition, in the wireless communication system to which the present invention is applicable, a UE can repeatedly perform grant-free UL signal transmission to improve the transmission success rate of the grant-free UL signal transmission.

However, when the number of times that a UE performs signal transmission on contention-based UL resources rather than dedicated UL resources which are supported in the conventional wireless communication systems increases, the collision probability between UEs may increase. In particular, if the UE use the same resources whenever performing the signal transmission, it may cause a series of collisions.

Moreover, if a feedback transmission method defined in the conventional wireless communication systems is applied to the above-described signal transmission and reception, it may significantly increase the signaling overhead. Thus, the present invention proposes channels for carrying feedback on grant-free signals, feedback transmission methods, and UE operations upon reception of feedback by considering the unique characteristics of the grant-free signal transmission.

Thus, the present invention describes in detail a method by which a BS transmits feedback by considering multiple feedback channels and a method by which a UE operates upon reception of the feedback when the UE performs UL transmission without dynamic scheduling from the BS and also performs transmission for the same Transmission Block (TB) one or more times.

In the following description, radio resources or resources may mean not only time/frequency resources but also elements distinguished from each other by multiple access schemes such as spreading codes, scrambling codes, interleaving patterns, power allocation, etc.

In addition, feedback, ACK, or NACK may include not only decoding results of received data but also response to a specific signal, which is transmitted from a BS to indicate successful UL transmission.

Moreover, although the present invention will be described based on UL channels/signals and grant-free/grant-based radio resources, the invention is not limited thereto. That is, the invention can be extensively applied to DL channels/signals and other radio resources.

3.1. Synchronous Timing Based A/N Channel Transmission

In the wireless communication system to which the present invention is applicable, if a UE performs UL signal transmission on allocated UL resources, a BS needs to provide feedback thereof to the UE. Thus, the following two methods can be considered as a method by which a BS provides feedback (e.g., A/N) indicating whether UL transmission is successful to a UE who transmitted a grant-free signal.

(1) Feedback Transmission Method Based on Type 1 Resources

The feedback transmission method based on type 1 resources (or resource type 1) may be a feedback transmission method using UE-specific resources. For example, the BS may include A/N information in a message such as UL grant and transmit it to a corresponding UE. Alternatively, the BS may allocate UE-specific dedicated resources and use the resources to transmit A/N to each UE.

(2) Feedback Transmission Method Based on Type 2 Resources

The feedback transmission method based on type 2 resources (or resource type 2) may be a feedback transmission method using resource-specific resources. In this case, the resource-specific resources may mean DCI including the A/N bitmap for a grant-free resource pool or time/frequency resources related to transmission resources like the PHICH of the legacy LTE system. Alternatively, the type 2 resources may mean resources differently determined according to the resources used by a UE for UL signal transmission.

In the case of feedback using type 1 resources, the BS can indicate which signal transmission the feedback is for by using HARQ process numbers according the ARQ scheme of the UE.

On the other hand, in the case of feedback using type 2 resources, the feedback should represent (or indicate) the time/frequency resources used for the corresponding (UL) signal transmission (performed by the UE).

To this end, a method of including resource information except time information in feedback based on type 2 resources and indicating the time information through the transmission time of the feedback can be applied. In other words, the feedback based on type 2 resources can indicate the resources for a corresponding (UE's UL) signal through the transmission time and separate resource information.

More specifically, assuming that the feedback transmitted at time # N includes information representing (or indicating) resource # R, the feedback may be considered as the feedback transmitted in response to the UL signal transmission on resource # R at time # N-K, which is apart from the time at which the feedback is transmitted by a fixed time interval of K. In this case, the time interval K may be determined by signaling from the BS in a UE-specific/resource-specific/group-specific manner. Alternatively, the time interval K may be determined depending on UE capability.

If 1:1 mapping of signal transmission resources and A/N resources is implicitly determined (for example, one index within a resource pool is used for one A/N index), a separate offset may be configured for an A/N index in order to avoid a collision between UEs with different K values. This configuration may be changed via higher layer signaling, DCI, or Medium Access Control Control Element (MAC CE), etc.

Assuming general synchronous HARQ-ACK transmission, A/N resources may have an implicit mapping relationship with time/frequency resources for grant-free UL transmission. This will be described in detail with reference to the following examples.

1) A PHICH or an A/N channel has N A/N resources, where N corresponds to the number of resources include in a resource pool in one slot. In addition, these resources may be distinguished from each other by frequency/code.

As a more particular example, timing M for A/N transmission can be implicitly determined. In this case, a UE may assume a different timing value according to its processing capability. Specifically, if the UE's processing capability is equal to or lower than the timing M (in other words, the minimum time required for the UE to switch its operation from UL signal transmission to DL signal reception (e.g., UL-to-DL switching time) is equal to or less than the timing M, the UE can assume the A/N transmission timing value to be M. On the contrary, if the UE's processing capability is higher than the timing M, the UE can assume the A/N transmission timing value to be 2*M. In this case, it is assumed that the same resource pool and A/N resources are not supported for a UE with processing capability higher than 2*M.

Here, the value of M can be configured per A/N resource or per A/N channel.

For a UE with the timing of 2*M, at least two A/N resources may be configured per index (i.e., one is for timing M UE and the other is for timing 2*M UE for the same resource). If multiple code blocks are transmitted per resource, additional A/N resources may be further configured per index.

As another particular example, timing K for A/N feedback transmission can be configured per UE. In this case, each UE may have a different K value, or individual UEs may be allocated A/N resources having different K values per resource (e.g., frequency/code resource) to avoid collisions therebetween. Further, different offsets may be configured according to the value of K.

2) A PHICH or an A/N channel has P ACK-NACK resources, where P corresponds to the number of received signals in a resource pool in one slot (regardless of whether reception is correctly performed or not).

In this example, it is possible to configure only resources for transmitting A/N for the used resources in the resource pool. Alternatively, it is possible to configure as many A/N resource as the resources used for feedback (e.g., NACK or ACK) transmission. According to this method, the identity information for K may be transmitted together with the A/N feedback or configured separately.

When mapping is performed according to example 2), the same or different A/N feedback timing may be configured for UEs as described in method 1).

In addition, when contention-based UL resources are used for grant-free UL signal transmission, if a collision between UEs occurs, each of the UEs should provide feedback thereof. If a UE attempts to perform signal transmission repeatedly, the UE may need to perform feedback transmission frequently.

In this case, if type 2 resources are used for the feedback transmission, the signaling overhead may be reduced. Meanwhile, when type 2 resources are used to transmit ACK, the UE may has the near-far-problem. Further, if the UE is a low power UE, the corresponding signal cannot be transmitted to the BS, and thus the UE may have a NACK-to-ACK error.

Therefore, a method of using different feedback channels according to the feedback to be transmitted and the resource configuration of a UE should be considered. Considering such a feedback channel and transmission repetition by a UE that performs grant-free transmission, the present invention proposes the following A/N transmission methods.

<1> A/N Transmission Per Repetition or for Each Reception

A BS can provide feedback on signal transmission to a UE per reception/repetition. In this case, if the UE performs repeated transmission, the BS may transmit to the UE multiple ACK or NACK for a single TB.

<2> A/N Feedback Transmission Only for the End of Repetition

A BS can provide a UE with feedback on the last repeated transmission performed by the UE.

Here, as a method for defining the UE's last repeated transmission, the number of repetitions can be predetermined by signaling between the BS and UE. In this case, it is assumed that the initial transmission of the UE can be distinguished from the repeated transmission (or retransmission). If the UE's last repeated transmission cannot be specified, it can be assumed that A/N transmission is performed for the TB transmitted on designated resources. For example, assuming that a grant-free resource (or signal) is transmitted every slot or mini-slot, resources for A/N signal transmission can be assumed to be every K slot or K mini-slot. The network may transmit the A/N signal for the initial or repeated transmission on the corresponding resources. In particular, if the network can distinguish between the same data, the network can perform ACK or NACK transmission after aggregation/accumulation of A/N for signals transmitted from the UE.

Alternatively, as another method for defining the last repeated transmission, the UE's last repeated transmission can be defined such that it is performed on the resources predetermined by signaling between the BS and UE. In this case, the signaling may be UE-specific/group-specific higher layer signaling or DCI/group DCI signaling.

Further, the UE's last repeated transmission can be defined such that it corresponds to the time at which the BS transmits the A/N signal. In detail, if a slot or mini-slot in which the BS transmits the A/N signal is configured in advance (e.g., slot or mini-slot # N), the initial transmission may be configured such that a resource (or signal) transmitted in slot or mini-slot # N-K corresponds to the last repeated transmission.

If the network does not know the starting point of the initial transmission, the UE may inform how many times the UE repeats the transmission before the corresponding repeated transmission in the form of data or UCI in each repetition.

As an applicable example, ACK can be transmitted on type 2 resources, and NACK can be transmitted on type 1 resources. Specifically, NACK is transmitted through UL grant, and UL resources indicated by the UL grant can be used by a UE for retransmission.

Alternatively, instead of ACK, other information can be transmitted on type 2 resources. In this case, upon receiving ACK, a UE recognizes that the ACK is received. However, if ACK is not indicated by resources designated for an A/N channel, the UE may not apply any assumption to the corresponding transmission. Thus, the UE may not perform retransmission before the network triggers the retransmission by transmitting UL grant. If there is no trigger for the retransmission through UL grant, the UE may perform buffer flushing after elapse of a predetermined time, continue the repeated transmission for the grant-free signal transmission, or not perform the retransmission.

As another applicable example, an A/N signal may be transmitted only on type 2 resources, and retransmission for transmission recovery may be performed on resources included in a grant-free resource pool. Alternatively, a resource pool for A/N signal transmission may be set equal to that for retransmission.

<3> ACK is Transmitted for all Repeated Transmission but NACK is Transmitted Only for the End of Repetition.

When feedback on UE's repeated transmission is ACK, a BS transmits the ACK in response to the repeated transmission. For the UE's last repeated transmission, the BS may transmit all types of feedback (e.g., ACK or NACK). Specifically, the BS may transmit feedback except NACK for all repeated transmission except the last repeated transmission, and in the case of the last repeated transmission, the BS may transmit all feedback (e.g., ACK or NACK).

For example, if the BS transmits, as feedback information, ACK, COLLISION, NACK, Discontinuous Transmission (DTX), etc., the NACK is transmitted only for the last repeated transmission, and the rest of the feedback information may be transmitted in response to all repeated transmission (or initial transmission).

If one of the ACK, COLLISION, and DTX is transmitted as the feedback information, the UE may perform different operations depending on the transmitted information. Specifically, if the feedback information is DTX, the UE may adjust a Modulation and Coding Scheme (MCS), power, or the like. If the feedback information is COLLISION, the UE may perform the subsequent signal transmission by selecting new resources or switching to different resources. If the feedback information is ACK transmission, the UE may stop the repeated transmission.

According to the above-described operations, until the end of the repeated transmission, the UE may use grant-free resources to overcome collisions and low SINR conditions. In addition, after performing the repeated transmission a predetermined number of times, the UE may start retransmission for recovery.

<4> ACK Transmission is Performed for the First ACK

In the case of the first ACK, a BS transmits feedback thereof. If the corresponding repeated transmission is the last repeated transmission, the BS may transmit ACK or NACK as feedback on the last repeated transmission.

Specifically, for all repeated transmission, the BS may transmit feedback on transmission except NACK and the first ACK, and if the corresponding repeated transmission is the last repeated transmission, the BS may transmit all feedback except the first ACK. Compared to operation <3> mentioned in the foregoing description, it has an advantage in that ACK overhead can be reduced.

For the A/N channel for carrying feedback according to the aforementioned transmission methods, type 1 resources or type 2 resources can be used. In this case, even if feedback includes the same information, a UE may perform different operations according to the A/N channel that carries the feedback. If the UE does not perform repeated transmission, the BS transmit an A/N signal by considering the initial repetition to be the same as the last repetition.

Such an A/N channel may differ depending on the total number of repetitions performed by a UE or each repetition order.

For example, if a UE freely changes the total number of repetitions or if different UEs have different numbers of repetitions on the same (signal transmission) resources, different A/N channel resources may be configured depending on the total number of repetitions in order to facilitate A/N channel mapping.

In this case, an A/N channel may be configured such that it is repeated according to the total number of repetitions performed by a UE. Alternatively, to distinguish between A/N signals for all repeated transmission, different A/N channels can be allocated according to repetition transmission order.

In this case, the total number of repetitions may be different from the number of A/N channels. The mapping relationship between A/N channels and repetitions may be predetermined by the BS through higher layer signaling. For example, regarding signal transmission every slot, if an A/N signal is transmitted after every K slots from a corresponding slot, the periodicity K of the A/N signal may be predetermined by the BS. Alternatively, based on separate table information, the repetition order for transmitting A/N signals may be predetermined according to the total number of repetitions.

The BS can transmit not only ACK/NACK but also information for assisting a UE to determine the success or failure of UL transmission. Specifically, the BS may inform not only the success of failure of corresponding signal transmission but also the cause of the failure of the signal transmission through an A/N channel.

For example, if UE's transmission fails, the BS may inform the UE of the following causes: 1) COLLISSION (i.e., the transmission failure is due to a collision with another UE); 2) DTX (i.e., the transmission fails to arrive at the BS); and 3) the transmission failure is due to decoding failure at the BS. In this case, the BS may transmit the information to the UE as follows.

1> When type 1 resources are used as A/N resources, the BS may indicate (or inform) COLLISION and DTX by adding a separate field to the transmitted information.

2> When both type 1 resources and type 2 resources are used as A/N resources, the BS may transmit an ACK signal on the type 1 resources in order to transmit the ACK signal in a UE-specific manner and transmit information on DTX/COLLISSION on the type 2 resources.

In this case, a UE may consider On-Off Keying (OOF) for the type 2 resources. For example, if a UE is allocated UE-specific resource R1 and resource-specific resource R2, the UE may receive ACK through R1 and determine NACK by on-off keying of R2. Thereafter, if necessary, the UE may determine a failure cause such as DTX/COLLISSION by decoding R2.

3> When multiple ACK/NACK is transmitted on a single physical radio resource, the BS may indicate other information by combining corresponding ACK/NACK in a specific manner.

For example, when one physical radio resource is shared between different UEs based on DM-RSs, the BS may transmit an A/N signal per DM-RS. In this case, the BS and UE may promise that a specific combination among A/N combinations indicates specific information. For example, when feedback information for all UEs is ACK, the BS and UE may define the corresponding case as a collision case.

4> When ACK/NACK for multiple UEs is transmitted on one physical radio resource and a UE can receive ACK/NACK for another UE, the UE may estimate the current case from the ACK/NACK for another UE.

For example, if a UE that performs signal transmission receives NACK and recognizes that there is another UE that receives ACK, the UE may determine the current case as the collision case.

Specifically, when ACK/NACK is received in a similar form to DCI format 3/3A, the BS may inform a UE of an information index and an information index range of UEs sharing the same resources. In this case, if information corresponding to the index of a specific UE is NACK and there is ACK for at least one different UE in a corresponding information index range, the specific UE may determine the current case as the collision case. On the other hand, if the information corresponding to the index of the specific UE is NACK and there is no ACK for other UEs in the corresponding information index range, the specific UE may determine the current case as a DTX case.

While a BS transmits feedback to a UE by using the above-described feedback transmission method, a slot may become unavailable at a specific time, or there may be no or insufficient available A/N resource.

For example, when an A/N signal is transmitted through DCI, the number of pieces of A/N feedback that can be transmitted in a scheduling time may be limited by the amount of resources, the size of information, or the configuration of a search space. Alternatively, if specific time/frequency resources are allocated as A/N resources, the corresponding resource region may be limited by other physical channels (e.g., PBCH).

Thus, when the BS cannot transmit any feedback for several reasons: for example, because the transmission time of A/N feedback overlaps with that of data, the UE operations need to be newly defined. Hereinafter, the UE operations when there is no A/N feedback transmission due to the above reasons will be described in detail.

[1] A/N transmission can be opportunistic.

Basically, the UE assumes that it may not receive any A/N signals. That is, when the UE does not receive feedback on signal transmission, the UE makes no assumption. In other words, when the BS transmits no A/N signal in response to the UE's signal transmission, the corresponding configuration does not affect the UE operation. According to this operation, only when the UE explicitly receives ACK, NACK, or specific information, the UE can perform relevant operation.

[2] A/N transmission is always assumed.

Basically, the UE assumes that A/N signals are transmitted for all signal transmission. In other words, when the BS cannot transmit an A/N signal in response to UE's signal transmission (or when the UE fails to any A/N signals), the UE assumes that the previous signal transmission fails and operate in the same way as when the UE receives NACK. Alternatively, when the UE fails to receive an A/N signal, as the default operation, the UE may operate in the same way as when the UE receives DTX. In this case, the UE may improve the reception performance by adjusting its power.

[3] In case no A/N signal is received, the UE considers it as ACK.

Basically, the UE assumes that ACK transmission can be dropped. In other words, when the UE does not receive any feedback information from the BS (for example, when no A/N is transmitted), the UE may assume that the previous signal transmission has been successful and operate in the same way as when the UE receives ACK.

In the above-described operations, A/N transmission can be performed according to one of the aforementioned A/N transmission methods.

Even if a UE receives the same feedback, the UE may perform different operations according to how the above-described UE operations and the A/N transmission methods are combined.

In addition, the UE may perform different operations according to the number of repetitions. For example, the UE operation when the A/N signal for the initial or repeated transmission is missed may be different from that when the A/N signal for the last repeated transmission is missed.

It is difficult for the UE to determine whether the BS transmits no feedback or the UE fails to receive feedback transmitted from the BS. Thus, to avoid malfunction caused by erroneous determination for the feedback, the UE may perform operation [1] among the above-described operations. Alternatively, the UE may operate rapidly by making an assumption for the feedback according to operation [2] or [3].

However, an erroneous feedback assumption may cause a collision between grant-free resource pools. For example, if an erroneous grant-free resource pool is configured or the UE misses the grant previously transmitted from the BS, the UE may not operate as intended by the BS. As a result, the UE may collide with another UE.

In addition, when A/N missing continuously occurs, the UE may experience large time delay. For example, if the BS fails to detect the identity of the UE due to the UE's erroneous resource pool configuration or an asynchronous state, the UE cannot complete its transmission correctly before performing a recovery procedure, for example, a procedure for resetting the synchronization with the BS or a procedure for reconfiguring the resource pool. Thus, in this case, relevant UE operation should be newly defined. Hereinafter, the UE operation applicable to the above-described situation will be described in detail.

1] When a UE performs grant-free transmission, if A/N missing continuously occurs as many times as specified by the predetermined value of K_missing, the UE stops the corresponding repeated transmission and starts new transmission.

2] When a UE performs grant-free transmission, if A/N missing continuously occurs as many times as specified by the predetermined value of K_missing, the UE performs grant-free reconfiguration. In this case, grant-free reconfiguration may mean that a UE switches to grant-based transmission according to signaling such as a Scheduling Request (SR). Alternatively, it may mean that feedback on grant-free failure is transmitted through an SR/PRACH or similar one and a new grant-free resource pool is allocated.

3] When a UE performs grant-free transmission, if A/N missing continuously occurs as many times as specified by the predetermined value of K_missing, the UE may use previously configured grant-free fallback resources instead of an allocated grant-free resource pool. In this case, fallback resources may correspond to a grant-free resource pool configured by the BS through signaling such as a Master Information Block/System Information Block (MIB/SIB) in a cell-specific/group-specific manner or UE-dedicated resources allocated in the grant-free configuration procedure.

The above-described operations can be similarly applied when a UE continuously receives signals indicating NACK, COLLISION, or DTX. Since the continuous transmission of the above state (e.g., NACK, COLLISION, DTX, etc.) may mean that the collision rate of the resource pool is high or the signal reception quality is extremely low, the UE may need to correct the configuration. For example, if DTX is continuously received, the UE should modify beams for signal transmission. In this case, the UE may repeat transmission by using the multiple beams.

According to the present invention, when NACK, COLLISION, or DTX continuously occurs, a UE can operate as follows.

(A) The UE can wait for handling by the BS. Specifically, if the UE does not autonomously determine COLLISION or DTX (for example, when an explicit DTX/COLLISION indicator is received), it can be assumed that the BS already knows whether the UE is in the DTX or COLLISION state. Thus, the UE may expect power control or grant-free reconfiguration from the BS and waits for handling by the BS. As an example of this case, the UE may stop the previously attempted signal transmission and switch to grant-based signal transmission.

(B) The UE can send a request for handling to the BS. If the UE autonomously determines COLLISION/DTX or uses latency-sensitive traffic, the BS cannot know whether the UE is in the DTX or COLLISION state or instantaneously handle it. Thus, the UE can directly send the request for handling to the BS.

(B-1) When the UE intends to send a request for DTX/COLLISION handling to the BS, the UE may send the handling request to the BS through higher layer signaling.

(B-2) The UE can send a request for DTX/COLLISION handling to the BS through UCI. For example, if the UE sends an SR through a specific SR resource, the BS may assume that the corresponding UE requests re-configuration (reconfiguration). Alternatively, the UE may transmit a grant-free report in a similar form to CSI in order to request handling by the BS. In this case, the grant-free report may be 1-bit information indicating the presence or absence of DTX or COLLISION.

(B-3) The UE can send a request for handling to the BS through random access. For example, if a grant-free UE requests random access, the BS may assume COLLISION/DTX or an erroneous configuration and performs grant-free re-configuration for the UE. Alternatively, if a specific preamble, which is not used in general random access, is reserved for a grant-free report, the UE may send a request for handling to the BS through the random access using the specific preamble.

(C) The UE can autonomously perform DTX/COLLISION handling. For example, if the UE recognizes DTX, the UE may perform the signal transmission again by ramping the transmission power. Alternatively, if the UE recognizes COLLISION, the UE may use other resources or backs off from the transmission during a predetermined time. In this case, the TX power ramping step or the back-off length may be determined by the BS through higher layer signaling or L1 signaling in a UE-specific or resource/group/cell-specific manner, or predetermined values may be used.

As described above, when the UE intends to perform new transmission or retransmission based on grant-free transmission, the UE can perform the transmission without scheduling from the BS. Accordingly, upon receiving feedback through a UE-specific message (e.g., UL grant, etc.), the UE can determine the feedback by combining resource allocation information included in an existing message. Hereinafter, the relevant operations will be described in detail.

A) The BS can use resource allocation information that is unused or occasionally used as ACK. For example, in the allocation information such as RA (Resource Allocation) type 2 of the conventional system, an index that is not present in the RIV to resource allocation mapping Table can be used to transmit feedback information to a UE. In other words, the BS can provide the feedback information to the UE by using the index in the RIV to resource allocation mapping Table, which is not defined in the conventional system. Alternatively, the UE may determine a certain value designated by the BS in extra resource allocation information as partial feedback information. Thus, the BS may transmit the resource allocation information including the designated certain value to the UE in order to transmit the feedback information to the UE.

B) The BS can use a currently unused HARQ process to indicate partial feedback information.

C) The BS can provide the UE with partial feedback information by combining the information described in A) and B) with predetermined information.

Even if a UE receives the same feedback (e.g., ACK or NACK), the UE can perform different operations according to the configuration of the aforementioned A/N resources, A/N signal transmission methods, and UE operations. Hereinafter, the relevant operations will be described in detail.

<A> A/N/Collision/DTX Transmission Per Repetition

When a UE receives NACK/COLLISON from a BS, the UE may stop the running repeated transmission and initiate new transmission, starting from initial transmission. This operation may cause unnecessary retransmission, but it may produce a benefit in terms of latency. When the UE receives DTX from the BS, the UE may change transmission parameters related to power, beam, etc.

Even when the UE receives NACK from the BS, the UE may continue repeated transmission in a grant-free resource pool. Thereafter, when the repeated transmission is completed, the UE may perform retransmission. When the UE receives COLLISION from the BS, the UE may set different resources in the grant-free resource pool. Alternatively, if the resources are changed due to the repeated transmission, the UE may select different resources in order to continue the repeated transmission. When the UE receives DTX from the BS, the UE may change transmission parameters related to power, beam, etc.

When the UE receives NACK and/or COLLISION and/or DTX from the BS, the UE may increase the number of repetitions by T1 and then continue the repeated transmission.

When the number of times that the UE repeats transmission is equal to more than a threshold value T2, if the UE receives NACK from the BS, the UE may transmit a different redundancy version of data from the next repeated transmission.

When the UE receives NACK/COLLISION for the last repeated transmission, the UE may stop the running repeated transmission and initiate new transmission, starting from initial transmission.

When the UE receives NACK/COLLISION for the last repeated transmission or when the UE fails to receive ACK until time N+K (it is assumed that the last repeated transmission time is N), the UE may increase the number of repetitions by T1 and continue the repeated transmission. In this case, K may be a scheduling time unit, which is equal to or more than 0.

<B> A/N Transmission Only for End of Repetition

When a UE receives NACK/COLLISION from a BS, the UE may stop the running repeated transmission and initiate new transmission, starting from initial transmission.

When the UE receives NACK/COLLISION from the BS or when the UE fails to receive ACK until time N+K (it is assumed that the last repeated transmission time is N), the UE may increase the number of repetitions by T1 and then continue the repeated transmission. In this case, K may be a scheduling time unit, which is equal to or more than 0.

<C> ACK Transmission Per Repetition, NACK Transmission Only for the End of Repetition When a UE receives ACK from a BS, the UE may stop the repeated transmission. When the UE receives NACK from the BS, the UE may perform one of the operations <B> mentioned in the foregoing description.

<D> ACK Transmission for the First Success, NACK Transmission

When a UE receives ACK from a BS, the UE may stop the repeated transmission. When the UE receives NACK from the BS, the UE may perform one of the operations mentioned in <B>.

In the above-described descriptions, if a UE performs new transmission, data transmitted during the new transmission may be completely identical to the previous data, correspond to a different redundancy version of the TB used for the previous transmission, or be data of a new TB that is unrelated to the previous transmission.

In addition, in the above-described descriptions, if the number of repetitions performed by a UE is changed, the UE may use a different redundancy version for the added repetitions (that is, the UE may use a different redundancy version of data for the added repetitions).

Depending on A/N channels carrying feedback, a UE may perform the aforementioned operations in the same way or differently. For example, the UE may perform the operations differently with respect to feedback received through type 1 resources and feedback received through type 2 resources by distinguishing therebetween or perform the operations in the same way.

In operation <A> mentioned in the foregoing description, the number of added repetitions T1, the threshold T2, and the time K can be determined by signaling between the UE and BS, determined by hardware characteristics of the UE, or restricted by latency requirements of transmitted data. In this case, the signaling between the UE and BS may mean resource-specific/UE-specific/group-specific higher layer signaling or DCI/group DCI.

3.2. Asynchronous Timing Based A/N Channel Transmission

When type 2 resources are used for an A/N channel, asynchronous A/N transmission may be required for flexible use of radio resources. Specifically, the feedback transmitted at time N may indicate feedback on transmission performed in a certain range from time N−1 to time N−K or part of the transmission. In this case, the A/N signal transmission can be performed as follows.

(1) When a BS transmits an A/N signal to a UE, the A/N signal may include timing information. Specifically, feedback may include the A/N signal and resource information R containing time information K, and upon receiving the feedback, the UE may consider the corresponding feedback as the feedback on the UL transmission, which is performed on resource R at time N-K, based on the information.

(1-1) The time information K may be autonomously determined according to the characteristics of data transmitted by the UE. For example, the time-domain location of resources for feedback reception may be differently configured according to the service type of the data transmitted by the UE.

(1-2) When the time/frequency resources used for grant-free transmission are determined according to the parameters used by the UE for the grant-free transmission, the BS may not transmit time information K or resource information R for A/N timing to the UE. Instead, the UE may determine time information K or resource information R based on the transmission parameters included in the A/N signal.

Specifically, an HARQ process ID used by the UE for the grant-free transmission may be identified by slot numbers, subframe numbers, or RB indices of the grant-free resources. Thus, the BS can determine the HARQ process ID of the grant-free transmission performed by the UE without distinguishing between initial transmission and repeated (or repetition) transmission.

For example, if UE A transmits a TB corresponding to HARQ process ID H1 in slots [a, b, c, d], the BS can assume all grant-free transmission transmitted in the corresponding slots from UE A as HARQ process ID H1. In addition, based on an HARQ process ID field included in an A/N signal, the UE can recognize that the corresponding A/N signal is for the grant-free transmission transmitted in the slots [a, b, c, d]. In particular, when A/N is transmitted through UL grant and an HARQ process capable of distinguishing between grant-free transmission and grant-based transmission is used, the UL grant may include an indication for distinguishing between the grant-free transmission and the grant-based transmission or two fields for indicating HARQ process IDs thereof, respectively.

(1-3) When the time/frequency resources used for grant-free transmission are determined according to the parameters used by the UE for the grant-free transmission, the BS may assume that the same TB is transmitted during the period from N to N+L. In this case, the UE may consider the feedback transmitted during the period from N+k to N+L+k, which is apart from the period from N to N+L by timing offset k, as feedback on the last transmission for the corresponding TB. For example, if the UE performs the grant-free initial transmission on periodic grant-free resources and the repeated transmission on different grant-free resources, the BS may assume that the same TB is transmitted during an interval between initial transmission resources. Alternatively, the grant-free resources for the initial transmission have high reliability, the BS may assume that the same TB is transmitted during the time period from reception of the initial transmission until reception of new initial transmission or before the reception of the new initial transmission. In this case, the UE may consider the feedback transmitted during the time period where the same TB transmission is assumed or during the time period which is apart from the corresponding time period by a specific offset.

(2) When a BS transmits an A/N signal to a UE, the A/N signal may include an A/N bitmap with a predetermined bit length, which indicate A/N per transmission time. Specifically, upon receiving feedback containing resource information R and an A/N signal composed of b1, b2, b3, bn, the UE may consider bk (where k=1, 2, . . . , n) as feedback on UL transmission performed at different times. Here, correlation between bit information and time may be configured by signaling between the UE and BS.

In the above-described feedback transmission methods, a UE may operate similar to A/N transmission with synchronous timing.

However, in the case of an asynchronous method, since the transmission time of feedback on UE's transmission is not fixed, a UE may need to defer its operation to wait for feedback on specific signal transmission regardless of which type of A/N resources the UE uses. Thus, there may occur additional time delay.

Accordingly, to reduce this time delay, the UE may operate as follows.

<A> When the UE completes transmission of TB1 but does not receive feedback on the last repeated transmission, the UE can restart the TB1 transmission without receiving the corresponding feedback.

<B> When the UE completes the TB1 transmission but does not receive the feedback on the last repeated transmission, the UE can start transmission of the next transmission block, i.e., TB2 without receiving the corresponding feedback.

3.3. Information of Type 2 Resource (Resource Type 2)

When a BS transmits an A/N signal for specific signal transmission by using A/N transmission resources corresponding to type 2 resources, the BS should be able to basically transmit the following elements on the corresponding A/N transmission resources:

(1) BS's feedback on the signal transmission; and
(2) Resource locations where the signal transmission is attempted or corresponding index information.

In this case, the resource locations may mean not only the physical locations of the resources but also, if the corresponding resources are divided for multiple signal transmission based on multiple access schemes such spreading codes, scrambling codes, interleaving patterns, power allocation, etc., the index of a corresponding multiple access scheme.

In this case, the BS may transmit A/N signals to UEs that use a resource pool by using one of the following methods based on the number of corresponding UEs, the amount of radio resources, traffic arrival rates, collision frequencies, etc.

1) The BS can transmit feedback on each resource in the form of a bitmap. For example, feedback F1 on resource R1 and feedback F2 on resource R2 may be transmitted in the form of bitmap [F1 F2]. When the UEs use radio resources frequently, the bitmap-based transmission method may reduce the signaling overhead. Alternatively, the bitmap-based transmission method may be used when information such as DTX/COLLISION needs to be sent.

2) The BS may transmit the indices of resources required for feedback transmission among all resources and corresponding feedback values. For example, feedback F1 on resource R1 and feedback F2 on resource R2 may be transmitted in the form of [R1 F1]. When the UEs use radio resources occasionally, this feedback transmission method may reduce the signaling overhead.

3) The BS may transmit feedback by combining methods 1) and 2), which are mentioned in the foregoing description. For example, assuming that physical resource P1 is divided into r1, r2, r2, and r4 according to the multiple access schemes and corresponding feedback F1, F2, F3, and F4 is transmitted, corresponding feedback information may be transmitted in the form of [P1 F1 F2 F3 F4].

3.4. HARQ-ACK for DL Repeated Transmission (DL Repetition)

The NR system to which the present invention is applicable can support Ultra Reliable and Low Latency Communication (URLLC). Accordingly, DL transmission may require low time latency and high reliability.

In this case, similar to UL transmission, it can be considered that a BS continuously transmits signals by using multiple scheduling time units to a UE. If each transmission is self-decodable or if decoding is performed by combining individual transmissions, the UE may transmit feedback on each DL repetition, feedback on the last repetition, or feedback on the successfully decoded transmission. In this case, by reversing the transmission direction of the aforementioned feedback transmission methods, the UE can perform feedback transmission.

In the conventional wireless communication system, a downlink resource assignment message, which is transmitted from a BS, indicates the radio resource of a scheduling unit used for transmitting the corresponding message. However, in the NR system to which the present invention is applicable, a DL resource assignment message may indicate the radio resources of multiple scheduling units or the radio resource away from a scheduling unit used for transmitting the corresponding message by a random time period.

For DL repeated transmission, a BS can transmit DL resource assignment (DL assignment) per repeated transmission or indicate multiple radio resources for repeated transmission through a single DL assignment message. Alternatively, the radio resources for the repeated transmission can be implicitly determined based on information included in DL assignment.

A UE can dynamically receive information on some or all of the time/frequency/code resources, which will be used to transmit HARQ-ACK for DL data, through DL scheduling. Such information on UL radio resources can be represented as a relative time location with respect to a certain reference time location and frequency resource information or indices thereof.

The transmission time can be determined from the above-mentioned information according to the following options. The options below can be applied to both repeated transmission and one-time transmission. Alternatively, the options can be applied when one-time data transmission rather than repeated transmission is scheduled in multiple mini-slots or multiple slots.

(1) Option 1

The timing of the feedback resource included in the DL assignment may be determined with reference to the transmission time or reception time of the DL assignment. If the timing is determined on the basis of OFDM symbols, the timing of the feedback resource may be determined with reference to the last symbol of the DL assignment or the last symbol in the control region where the DL assignment is received. Alternatively, the timing of the feedback resource may be determined with reference to the last symbol of the semi-statically designated control region. If the timing is determined on the basis of slots or mini-slots, the timing of the feedback resource may be determined with reference to the slot or mini-slot in which the DL assignment is received.

(2) Option 2

The timing of the feedback resource included in the DL assignment may be determined with reference to the start or end of the downlink resource (e.g., PDSCH) indicated by the DL assignment. If the timing is determined on the basis of OFDM symbols, the timing of the feedback resource may be determined with reference to the start and last symbol of data transmission. If the timing is determined on the basis of slots or mini-slots, the timing of the feedback resource may be determined with reference to the slot or mini-slot in which the DL assignment is received.

(3) Option 3

When the DL assignment includes multiple radio resources for repeated transmission, the timing of corresponding feedback resource information may be determined with reference to the start or end of the last resource in terms of time among the multiple resources. That is, the timing of the feedback may be determined with reference to the time at which the repeated transmission ends.

(4) Option 4

When the DL assignment includes multiple radio resources for repeated transmission, the timing of corresponding feedback resource may be determined with reference to the start or end of the Nth resource among the multiple radio resources. In this case, the value of N may be semi-statically determined by the BS or included in the DL assignment.

The UE can perform feedback transmission for DL repeated transmission by using one of the above-described options.

If the UE requires multiple feedback resources to transmit feedback on some or all of the repeated transmission, the UE may repeatedly use the feedback resource information, which is obtained by using one of the options, at a certain time interval, and more specifically, use the feedback resource information K' times.

According to the aforementioned method, multiple HARQ-ACK transmission may be continuous or discontinuous in time (for example, the HARQ-ACK time interval may vary). In addition, the repeated transmission associated with the repeated HARQ-ACK transmission may be discontinuous. For example, if K' is less than the number of repetition K, a UE may not transmit any A/N signal for random repeated transmission.

In this case, K' may be semi-statically determined by the BS in a cell-specific/UE-specific manner. Alternatively, it may be included in DL assignment and transmitted UE-specifically. Further, a time interval between A/N transmissions for the same repetition bundling may be indicated by the BS (for example, through higher layer signaling or DCI indication).

The above-described configuration can be applied to not only an A/N feedback configuration for DL or analysis method therefor but also an A/N feedback configuration for grant-based UL transmission or analysis method therefor. In this case, DL assignment may be replaced with UL grant.

3.5. HARQ Process ID Determination in UL Transmission without Grant

When a UE receives feedback through type 1 resources such as UE-specific DCI from a BS, the link between HARQ-ACK and UL transmission can be determined based on the HARQ process number (or HARQ process ID) for the feedback as described above.

In this case, the UE should autonomously determine the HARQ process number (or HARQ process ID) for its UL transmission. Since the determined HARQ process number (or HARQ process ID) should be informed the BS before the BS decodes the corresponding transmission, the UE should be able to obtain information on the HARQ process number from information shared between the BS and UE.

In addition, when combining (e.g., HARQ combining based on incremental redundancies) between the repeated transmission (repetitions) performed by the UE is considered, the UE should be able to obtain the order of the repeated transmission together with the HARQ process number.

For example, as a method for indicating a TB index, an HARQ process number (or HARQ process ID), order of repetitions, and the like, the following options can be used.

(1) Opt. 1: Time resource index used in UL transmission without grant (2) Opt. 2: Frequency resource index used in UL transmission without grant (3) Opt. 3: DM-RS sequence or parameter used in UL transmission without grant (4) Opt. 4: UCI on self-decodable channel When options 1 to 3 are used, the maximum number of UEs that can share grant-free resources may be reduced. For example, it is assumed that the total number of DM-RS sequences is 8 and individual UEs are distinguished from each other by using the DM-RS sequences. In this case, if two HARQ process numbers [0, 1] need to be indicated by a DM-RS, up to four UEs can be distinguished from each other by using the DM-RS sequences.

This problem can be solved by doubling the amount of time or frequency resources. In other words, the decrease in the amount of accommodated UEs when options 1 to 3 are used can be solved by using resources in another domain.

However, in the case of a DM-RS, it may be difficult to increase the amount of accommodated UEs. Thus, to solve the decrease in the amount of accommodated UEs, more RS sequences are required, and thus an additional RS resource region is also required.

Considering diversity gain for UE's repetition orders and UE's transmit power, the UE and BS may use option 1 basically and use option 2 if necessary.

The UE's HARQ process number (or HARQ process ID) may be regardless of the above-described options. However, if the UE does not transmit two or more TBs at the same time, it is preferred to use option 1.

If the UE use option 4, information can be indicated more flexibly compared to other options, but the overhead may increase according to the size of a TB index.

Hereinafter, methods by which a UE represent N pieces of information by using options 1 to 3 mentioned in the foregoing description will be described in detail.

1) A BS can periodically allocate N UL resources according to option 1, and thus a UE can transmit UL signals (e.g., grant-free UL signals) on the allocated UL resources. In other words, according to this method, the N periodic UL resources are allocated for the UE using N HARQ processes, and the BS recognizes each HARQ process from signal transmission performed by the UE on each resource.

2) A BS can allocate N UL resources existing in different frequency regions according to option 2, and thus, a UE can transmit UL signals (e.g., grant-free UL signals) on the allocated UL resources in the different frequency regions. According to this method, the N UL resources in the different frequency regions are allocated for the UE using N HARQ processes, and the BS recognizes each HARQ process from signal transmission performed by the UE on each resource.

3) A UE can transmit one of N different RS sequences together with user data according to option 2.

According to the aforementioned methods, the side effects can be compensated for by using different resource domains. Thus, the BS can establish configurations for UEs by considering the aforementioned effects.

In addition, the methods can be simultaneously used to represent multiple pieces of information. For example, to indicate N HARQ processes and M repetition orders, the UE may indicate the N HARQ processes by using option 1and indicate the repetition orders by using option 3. In addition, the BS may promise the UE to indicate the N HARQ processes by using option 1 and indicate the repetition order by using option 3.

Moreover, to indicate all information, the UE may repeatedly use the same method.

FIGS. 11 and 12 schematically illustrate relationships between HARQ process IDs (or HARQ process numbers) and periodically allocated resources according to an embodiment of the present invention.

As shown in FIGS. 11 and 12, a UE may use option 1 to indicate N HARQ process numbers (or HARQ process IDs) and M repetition orders. In FIGS. 11 and 12, Hx means HARQ process number=x (or HARQ process ID=x), and Rx means repetition order=x.

To this end, the BS and UE may promise that the allocated resources and the HARQ process number (or HARQ process ID) and repetition order for each resource are configured as shown in FIG. 11 or 12. Accordingly, the BS may allocate N periodic resources (R1, R2, and R3 corresponding to Hx, where x=1, 2, or 3) for the UE M times (M=3) as shown in FIG. 11 or 12.

The effects obtained by distinguishing between UE-IDs (e.g., C-RNTIs) or TB indices (e.g., HARQ Process Numbers (HPNs) and repetition orders) may vary according to the resource domain used therefor.

Alternatively, as described above, use of a certain resource domain may be prohibited (or restricted) in order to obtain the diversity.

In addition, the efficient configuration may vary according to the number of UEs sharing grant-free resources or the characteristics of traffic. Thus, when UE-IDs and TB indices are distinguished by using the grant-free resource configuration, the network may properly select a resource domain according to the current situation.

When repeated transmission is applied, a method used by a UE to indicate a TB index and a method for transmitting retransmission grant based on the obtained TB index can be additionally considered in order for a BS to obtain the index of the TB transmitted from the UE. According to the present invention, the following methods can be applied.

<1> (separating transmission between initial and repetition) When indicating a TB index, a UE may distinguish between initial transmission and repeated transmission instead of indicating all repetition orders. In this case, other TB information (e.g., HPN) except the repetition orders (initial or not) may be determined only by the initial transmission. If there is a predetermined pattern between the initial and repeated transmission, a BS may determine not only whether the repeated transmission is performed but also the TB information of the repeated transmission by detecting the UE's initial transmission. When Alt. 1 is applied, if the BS cannot determine the TB information of the repeated transmission due to missing of the initial transmission, the following methods can be additionally used.

When the transmission is repeated K times including the initial transmission, if continuous (K−1) times repeated transmission is received due to missing of the initial transmission or if the repeated transmission has a specific pattern mapped to the TB information of the initial transmission, the BS may assume a TB index estimated from the information to be equal to the TB information of the repeated transmission. As an example of the specific pattern, if there is an interval between resources that can be used for the initial transmission, it can be assumed that repeated transmission in the corresponding interval is mapped to one TB. If the corresponding repeated transmission is received, an HARQ process ID can be estimated based on the closest initial transmission resources.

Even when the BS cannot accurately estimate the TB index of specific transmission, if the BS can check that a specific transmission bundle is a transmission bundle for the same TB based on a certain pattern or relationship (for example, if the BS can recognize that received repeated transmission corresponds to the same TB because (K−1) transmission occurrences are not always transmitted between TBs), the BS may request the UE to retransmit the corresponding TB by using a random TB index and the reception timing of grant-free transmission. In this case, one of the TB index values used by the UE may be selected as the random TB index, or it may be set to a specific TB index which means an unknown TB index. As another example, when it is assumed that the initial and repeated transmission exists only in one slot or M slots or when it is assumed that the initial and repeated transmission uses the same mini-slot resources per slot, the UE or BS may assume that the initial and repeated transmission transmitted in the same slot or 'M' slots has the same HARQ or that all transmission with the same mini-slot index has the same HARQ. In this case, to change an HARQ process ID, the UE may transmit a signal by using another slot, 'M' other slots, or another mini-slot index. For example, when K HARQ processes are supported, the BS may allocate K grant-free resources in one slot and then determine an HARQ process index according to a mini-slot index in the slot.

When the BS fails to receive the initial transmission (when the initial transmission is missed), the BS may assume that all other signal transmission (e.g., repeated transmission) including the initial transmission is not received.

<2> (No soft combining among repetition) When indicating a TB index, a UE may indicate a TB index independent for all signal transmission without distinguishing whether corresponding signal transmission is for the same TB. For example, if the UE performs repeated transmission four times for a specific TB, the four times repeated transmission may have different TB indices. For retransmission of the received TB, the BS may indicate the TB index or inform the reception timing of grant-free transmission with a random TB index. In this case, the BS separately decodes multiple transmission for the same TB. Thus, even if the BS successfully decodes some signal transmission, the BS may request retransmission of the remaining signal transmission. At this time, explicit feedback indicating successful transmission may be required. Alternatively, a method for including TB information in a TB (e.g., MAC header) may be considered to allow the BS to determine whether the corresponding TB is the expected one after decoding. In addition, since the UE performs several HARQ processes for the same TB, the UE may receive multiple UL grant with different TB indices (e.g., HPNs) for the same TB from the BS. In this case, the UE may additionally use the following methods.

The UE performs the retransmission through the first appearing UL grant and may ignore the remaining UL grant for the same TB. In terms of time delay, since the UE cannot be convinced that its TB is successfully transmitted, the UE may preferentially handle the first received UL grant.

To obtain a high transmission success rate, the UE may perform the retransmission for all received UL grant. When receiving feedback indicating that one of the signals transmitted for the same TB is successful, the UE may ignore UL grant received thereafter.

The UE may wait to receive information indicating whether transmission is successful until the last feedback. Next, if it is determined that all signal transmission fails, the UE may attempt to perform the retransmission by using the last received UL grant.

<3> (indicating NDI as TB index): When indicating a TB index, a UE may always map continuous signal transmission to one TB. In other words, the UE may not perform transmission for different TBs alternately. By doing so, the next TB can be distinguished from the previous TB. For example, when the UE use a TB different from the previous one, the UE may use different time resources, frequency resources, or RS parameters. The BS may indicate the reception timing of one of the received UL transmissions in order for the UE to perform retransmission. The corresponding UL transmission may be the first, last, or random signal transmission of the UL transmission mapped to the same TB.

In the above-described operations, a BS may use the feedback transmission methods described in sections 3.1 and 3.2 to indicate the reception timing of grant-free transmission. In addition, the BS may use a relative time offset value with reference to a certain reference point to indicate the reception timing. In this case, the reference point may be a feedback transmission time, a frame such as SFN, a subframe, a slot index, etc.

When the repetition order of each transmission is indicated by a TB index, the number of repetitions K needs to be considered for the resource configuration. For example, if a UE repeats transmission four times, a BS may configure four or more resources for the same TB. In this case, the number of repetitions K may be UE-specifically configured.

Thus, when multiple UEs share a single time/frequency resource, each of the UEs may have a different number of repetitions K. In this case, the following methods can be applied.

1> Resource allocation may be performed with reference to the highest value among the repetition numbers K used by the UEs sharing the single resource. For example, if UEs A and B has repetition numbers, K1 and K2 (K1>K2), respectively, resources are allocated to both UEs A and B with reference to K1. Thereafter, after performing K2 repetitions by using the allocated resources, UE B may empty (not use) the remaining resources. In this case, how UE B selects K2 resources from among the K1 resources may be determined via higher layer signaling or L1 signaling, or it may be predetermined.

2> A limitation may be imposed on the number of repetitions performed by a UE, K. Resources may be allocated to each UE based on the smallest K value. Thereafter, each UE may use the resources in a nested form.

Figures 13, 14:
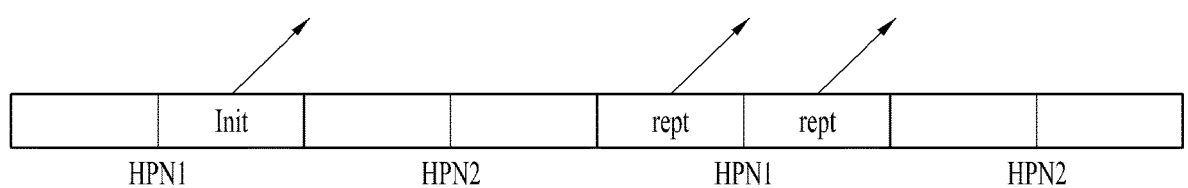
FIG. 13 illustrates an example of allocating resources based on the number of repetitions according to an embodiment of the present invention.
FIGS. 14 to 16 schematically illustrate examples of resource allocation when three times repeated transmission including initial transmission is configured.

FIG. 13 illustrates an example of allocating resources based on the number of repetitions according to an embodiment of the present invention.

It is assumed that each UE can use only one of the K values: 2, 4, and 8 as shown in FIG. 13. In this case, if resources are allocated for eight times transmission, each UE may use the resources allocated as shown in FIG. 13 according to the K value.

When a UE indicates the order of repetitions through allocated resources as described above with reference to method 1), a method for distinguishing between two types of transmission: initial transmission and other transmission may be considered. Considering time delay, the UE may use the other options except option 11 to start initial transmission at a random time.

If a BS recognizes that the UE starts the transmission through the TB index of the initial transmission transmitted by the UE, the BS may obtain the location of the next transmission and order thereof from a predetermined pattern. Thus, N resources for indicating the repetition order may be unrelated to the number of repetitions performed by the UE, K.

Alternatively, when the BS does not need to know the repetition order even though the UE performs the repeated transmission (for example, when other information except an HPN is not required because HARQ combining is performed by a chase combining method), the BS may require only a pool for repeated repetitions. In this case, the size of the resource pool for the repetitions may be configured regardless of the number of repetitions K.

Figure 15:
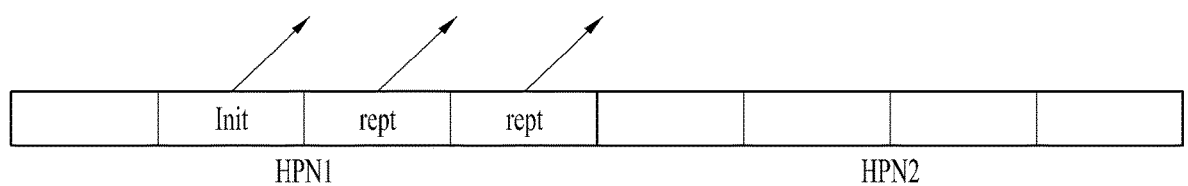
Figure 16:
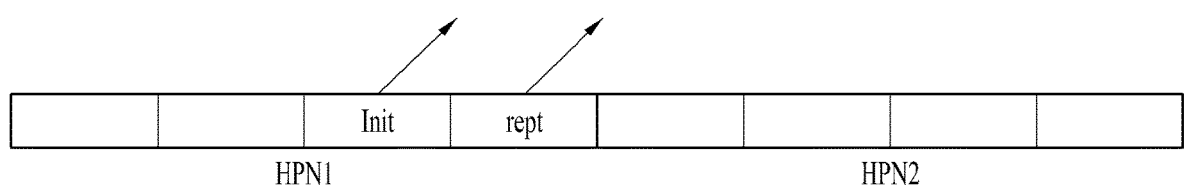

FIGS. 14 to 16 schematically illustrate examples of resource allocation when three times repeated transmission including initial transmission is configured.

In FIGS. 14 to 16, when the amount of used resources is less than K, it is beneficial to operate multiple HARQ processes. In addition, considering that grant-free transmission is switched to grant-based transmission through UL grant, a UE may switch to the grant-based transmission during an idle interval in order to avoid unnecessary repetitions.

As shown in FIG. 14, when a specific UE uses more than K resources, the specific UE may continuously perform K repetitions in many intervals. However, in this case, the time required to reach a next resource in the same HPN may relatively increase. As another example, the specific UE may drop repeated transmission on the next resource mapped to the same HPN by considering a latency boundary as shown in FIGS. 15 and 16.

As described above, an HARQ process can be determined based on only the (resource) location of the initial transmission. In this case, to allow a UE to perform K repetitions on consecutive transmission occasions and at the same time, transmit two or more TB sequentially, a method for mapping an additional HARQ process ID is required with consideration of the number of repetitions K.

Figure 17:
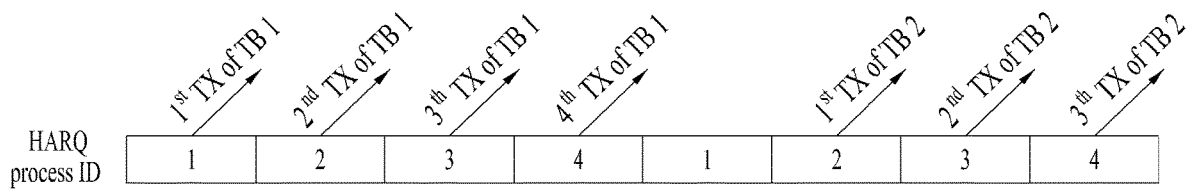
FIGS. 17 and 18 schematically illustrate that a UE continuously transmits two TBs (TB1 and TB2).
Figure 18:
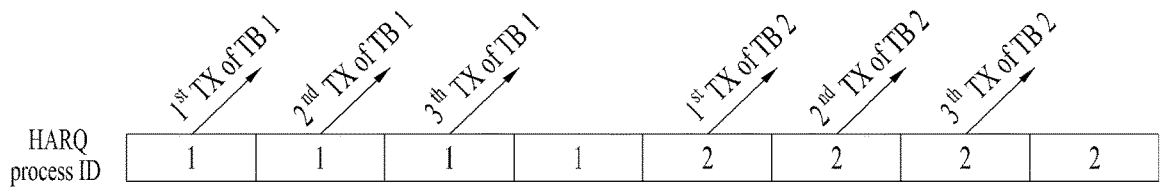

FIGS. 17 and 18 schematically illustrate that a UE continuously transmits two TBs (TB1 and TB2). When the UE continuously transmits the two TBs (TB1 and TB2) as shown in FIGS. 17 and 18, if the number of repetitions (K) and the number of HPNs (MAX_HPN) are not considered, the following problems may occur.

Specifically, FIG. 17 shows that in the case of K=4 and MAX_HPN=4, HPNs are sequentially mapped. In this case, if a UE performs more than four repetitions by mapping HPN1 to TB1, the next transmission occasion corresponds to HPN1 again, and thus the UE should defer the transmission until a transmission occasion with another HPN.

FIG. 18 shows a case in which a HPN is mapped to N consecutive transmission occasions. In FIG. 18, if more than K transmission occasions are mapped to the same HPN, the UE should defer the signal transmission until a slot mapped to another HPN as shown in FIG. 17.

When a UE defers the signal transmission as described above, it may cause additional time delay. Thus, the following conditions may be considered to prevent the UE from deferring the signal transmission to avoid overlapping between HPNs.

N should be equal to or less than K. If MAX_HPN is 2, N is equal to K.

MAX_HPN*N should be more than K.

When K is more than MAX_HPN*N, MAX_HPN*N cannot be a factor of K.

When K is equal to MAX_HPN*N, a different HPN is mapped per

MAX_HPN*N. For example, in the case of N=1 and MAX_HPN=K=4, such an HPN mapping method as [0 1 2 3], [1 2 3 0], [2 3 0 1] . . . can be considered.

As the simplest method satisfying all of the above conditions, a mapping method of using the relationship of N=K regardless of MAX_HPN can be considered.

Alternatively, if some of the conditions are satisfied, the number of cases where a UE defers TB transmission to avoid overlapping between HPNs may be reduced. Thus, mapping that satisfies some of the conditions can be allowed for the flexibility of HPN mapping and other operations. For example, when part of signal transmission is missed, N may be higher than K to avoid a situation that HPNs cannot be distinguished from each other.

When a UE performs repeated transmission, it may be considered that a BS perform soft combing of the repeated transmission. In particular, when the BS performs soft combining based on an incremental redundancy scheme, the UE may perform transmission by using a different redundancy version (RV) in each repetition. However, when the UE transmits a signal without grant, the BS cannot know which RVs the UE uses. Therefore, the BS and UE need to promise which RVs will used for grant-free transmission. In this case, the following methods can be applied.

(A) The transmitted RVs may automatically change according to the transmission order of the UE. If the BS can accurately grasp the transmission order of the UE at reception time (for example, when the UE always starts the transmission at a fixed (time) location and continues the repeated transmission according to a predetermined rule, when the UE (separately) indicate the transmission order in repeating the transmission K times, or when the UE indicates the order of the initial transmission by using separate resources), the BS may perform decoding by estimating the RVs based on the transmission order of the UE.

(B) The RVs that will be used by the UE for signal transmission may be determined according to grant-free UL resources allocated to the UE (that is, a mapping relationship between the RVs and grant-free UL resources can be established). This mapping relationship may be determined according to time and/or frequency indices used by the UE for signal transmission or vary in each transmission occasion of the allocated resources according to a predetermined pattern. In this case, the pattern may be determined by the BS through L1 signaling or RRC signaling, or it may be predetermined.

When method (B) is used, the performance may vary according to the RV used by the UE.

For example, the grant-free resource allocated to the UE may become unavailable for several reasons such as reserved resources of the system, a Random Access CHannel (RACH), Sounding Reference Signal (SRS) configuration, dynamic Time Division Duplex (TDD), etc. Thus, some RV patterns used by the UE may be dropped.

In addition, when another UE performs signal transmission at the same time, the BS may not correctly receive the corresponding signal transmission.

In general, whether system bits are transmitted or not dominantly affects the performance of TB reception. Thus, if transmission of an RV containing multiple systematic bits is dropped while a UE performs repeated transmission, it may cause significant performance degradation. Accordingly, RVO that includes most of the systematic bits needs to be configured to be repeatedly transmitted at least one time (the number of repetitions may increase if necessary). To this end, the following matters can be considered.

A) Multiple RVOs are included in an RV pattern.

B) When a UE performs K repetitions for the same TB and an RV pattern is mapped to transmission occasions, the RV pattern may be configured such that at least one RVO, which includes most of the systematic bits, is included in K transmission occasions. Alternatively, the length of the RV pattern may be configured to be shorter than K.

C) When a UE performs K repetitions for the same TB and an RV pattern is mapped to resource indices, different mapping (pattern) may be applied per UE or grant-free configuration. In this case, the applied mapping (pattern) may be mapping (pattern) where the BS is highly likely to receive RVO by considering the location of resources, periodicity, etc., which are used by the UE.

The above-described RV pattern may differ per UE, grant-free configuration, or cell, or it may be changed during the operation. When a new RV pattern is allocated or when the existing RV pattern is changed, the UE may operate as follows to determine when the UE should use the new RV pattern.

<A> When an RV pattern is determined through L1 signaling, the UE may use the corresponding RV pattern at the time when the L1 signaling is received. In this case, the BS may receive feedback from the UE to check whether the L1 signaling is successfully received.

<B> The UE may determine when to apply a new RV pattern based on the index of a time resource shared with the system. For example, the UE may use the RV pattern from the System Frame Number (SFN) appearing after the SFN where the RV pattern is received. Alternatively, the UE may determine the application time of the RV pattern based on offset information provided with reference to SFN0 or the current SFN.

<C> An RV pattern can be determined by a grant-free resource configuration or a message equal or similar to the configuration. In this case, the UE may use a new RV pattern from the application time of grant-free resources.

Additionally, when the BS signals an RV pattern, it is not necessary to provide feedback on the RV pattern. In this case, the BS may perform blind decoding of two RV patterns (e.g., previous and new RV patterns).

If only repeated transmission except initial transmission is delivered to a BS although a UE performs signal transmission K times, until reception of all (K−1) times repeated transmission, the BS cannot specify HARQ process numbers of the corresponding repeated transmission. That is, when the initial transmission is missed, the BS may ignore the following repeated transmission.

If the probability of missing the initial transmission is sufficiently low, the above effect can be ignored. Additionally, the following methods can be considered to reduce the probability of missing the initial transmission.

A> Non-Symmetric RS Sequence

When the initial transmission is distinguished from the repeated transmission by using different RS sequences, the RS sequence used for the initial transmission may be allocated more robustly than that for the repeated transmission. If the initial transmission is distinguished from the repeated transmission by using different cyclic shifted RSs, the CS gap of the RS used for the initial transmission may be larger than that for the repeated transmission.

Figure 19:
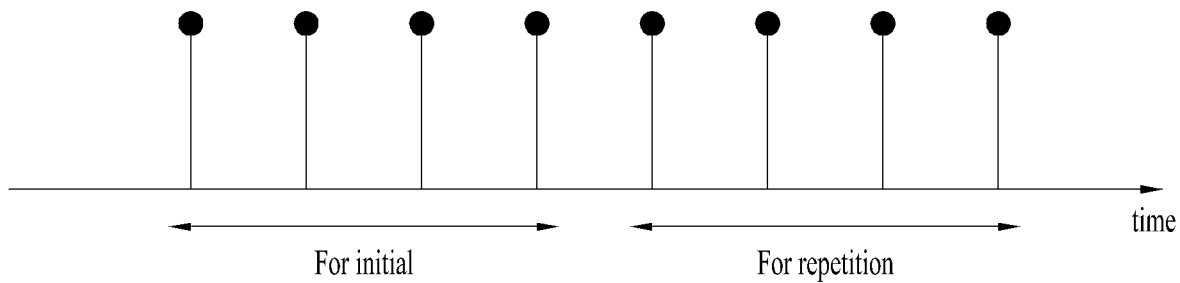
FIGS. 19 and 20 schematically illustrate CS gaps applicable to initial and repeated transmission according to the present invention.
Figure 20:
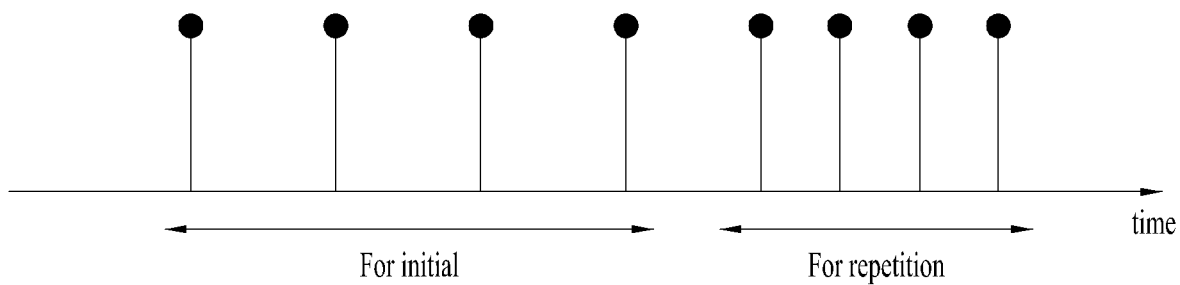

FIGS. 19 and 20 schematically illustrate CS gaps applicable to initial and repeated transmission according to the present invention.

FIG. 19 shows a configuration where all RS sequences used for the initial and repeated transmission have the same CS gap. FIG. 20 shows a configuration where the RS sequences used for the initial transmission has a CS gap larger than that of RS sequences used for the repeated transmission.

That is, when the RS sequences used for the initial and repeated transmission have different CS gaps as shown in FIG. 20, the probability of missing the initial transmission can be minimized.

B> Non-Symmetric Power Control

A UE may use different TX power for the initial and repeated transmission. For example, the UE may perform the initial transmission by additionally allocating as much TX power as a predetermined offset for the initial transmission.

3.6. Handling of Multiple HARQ Processes by UE-Specific HARQ-ACK Feedback

When a UE receives HARQ-ACK feedback on grant-free UL transmission, the UE can switch its UL transmission mode to grant-based UL transmission mode based on the feedback. In the case of grant-free UL transmission, since a UE can autonomously determine an HARQ process, a BS needs to reserve the corresponding HARQ process in advance. In this case, if the corresponding HARQ process is switched to a grant-based process, there may occur a mismatch between the UE and BS. To overcome this mismatch, the present invention describes in detail how a UE and a BS operates when the UE switches from grant-free UL transmission to grant-based UL transmission.

(1) Use of the Same HPN

The BS may reserve a specific HARQ process number in order to use it only for grant-free transmission. In this case, the corresponding HPN may be temporarily used for grant-based transmission only for retransmission associated with grant-free transmission. In this case, the corresponding HPN cannot be used for grant-free transmission until transmission of a corresponding TB is completed.

Priority may be given to a grant-free HARQ process. Specifically, when HPN X operates in a grant-free manner, if UL grant indicates the same HPN, the UE may ignore the corresponding UL grant.

(2) Switching to Another HPN when Transition from Grant-Free Mode to Grant-Based Mode Occurs In this case, the previous HPN, that is, the HPN before switching can be used for grant-free transmission for the next TB.

As described above in sections 3.1 and 3.2, the correlation between UL transmission and UE-specific HARQ-ACK feedback related to the UL transmission may be specified by the HPN of the corresponding UL transmission and HPN information included in the corresponding feedback, the resources used for the corresponding UL transmission and resource information included in the corresponding feedback, or the resources used for transmitting the feedback. Considering the above correlation, a UE can switch from grant-free transmission mode to grant-based transmission mode according to the following messages.

1) When method (1) mentioned in the foregoing description is applied, the UE can switch from the grant-free transmission mode to the grant-based transmission mode based on HARQ-ACK feedback containing the HPN of grant-free transmission and grant-based resources for the UE.

2) When method (2) mentioned in the foregoing description is applied, the UE can switch from the grant-free transmission mode to the grant-based transmission mode based on HARQ-ACK feedback containing grant-free resources and HPN information of grant-based transmission to be used. In this case, as a method for excluding an HPN, a connection relationship between feedback and grant-free UL transmission may be established.

2-1) CRC scrambling of HARQ-ACK feedback varies according to the grant-free transmission or the HPN related to the transmission.

2-2) The resources for transmitting HARQ-ACK feedback vary according to the grant-free transmission or the HPN related to the transmission.

2-3) HARQ-ACK feedback may include resource allocation used for grant-free transmission or indices thereof.

2-4) HARQ-ACK feedback may include not only the HPN of grant-based transmission but also the HPN of grant-free transmission.

Even if the HARQ process ID of grant-free UL transmission is configured independently from that of grant-based UL transmission, the total number of HARQ processes that operate at the same time may be limited by a UE's soft buffer. In this case, assuming that the maximum number of HARQ processes is N, the number of HARQ processes for grant-based transmission may be limited to N−1 to allow a UE to perform the grant-free transmission without any restriction. Alternatively, the UE may arbitrarily stop one of the HARQ processes of the grant-based UL transmission and perform the grant-free transmission.

3.7. Information for Handling A/N Missing Case

Regardless of transmission feedback types, feedback may not be received. To handle the missed feedback, the following matters can be considered.

Since a BS does not require a confirmation message for feedback, the BS cannot know whether the corresponding feedback is successfully transmitted.

For example, when the corresponding feedback is NACK (in particular, when transmission failure is indicated through DCI including RA information), the BS may expect that a UE will perform retransmission. Thus, the BS may attempt to receive the expected retransmission on corresponding RA.

However, in this case, if the UE does not receive the corresponding DCI, the BS will fail to receive the retransmission from the UE. Thus, the BS may request the UE to perform the retransmission again (i.e., second retransmission).

In this case, if the UE receives feedback on the second retransmission, which the UE does not understand (in particular, when the corresponding feedback is associated with grant-free resources similar to the feedback based on type 2 resources, or when transmission is associated with UL grant due to reception timing of DCI rather than the HARQ process number of a TB even though the corresponding feedback is transmitted on type 1 resources), the UE cannot grasp the TB that should be retransmitted.

Accordingly, to solve the problem, the following methods can be considered.

(1) Retransmission is always performed at fixed timing, t_HARQ (synchronous HARQ).

Specifically, although a UE receives UL grant at time T, signal transmission performed by the UE may not exist at time T−t_HARQ. In this case, the UE may assume that the UL grant corresponds to the UL grant (feedback) on signal transmission performed at time T−n*t_HARQ, where n is a natural number greater than 1.

Additionally, a BS may explicitly inform the UE of nth retransmission through DCI. Accordingly, when the UE receives UL grant including the DCI, the UE may assume that the corresponding UL grant is the feedback on the signal transmission performed at the time T−n*t_HARQ.

(2) A UE may use UL grant reception timing or a time window where the UL grant is received in order to determine UL transmission corresponding to the UL grant. In this case, a BS may provide the UE with offset information on the corresponding time or time window by including the offset information in the UL grant.

In this case, the signal transmission indicated by the UL grant for the nth retransmission may always be the initial transmission. In this case, as a method for indicating the number of times of retransmission, the BS may add an explicit bit field to the UL grant or change the CRC scrambling used for transmitting the UL grant. By doing so, the UE can estimate the number of times of retransmission.

(3) UL grant may include resource information on previous signal transmission. Accordingly, a correlation relationship between UL grant and a TB may be established. In this case, the amount of information that can be indicated by the corresponding resource information may become sufficiently large, and it may always indicate the initial transmission regardless of the number of times of retransmission.

(4) UL grant may include resource information on previous signal transmission. Accordingly, a correlation relationship between UL grant and a TB may be established. In this case, a BS may indicate difference between the initial transmission and the previous transmission by including separate offset information in the resource information on the previous signal transmission. Thus, the UL grant may simultaneously represent the (time) location of the initial transmission and the (time) location of the previous transmission.

Figure 21:
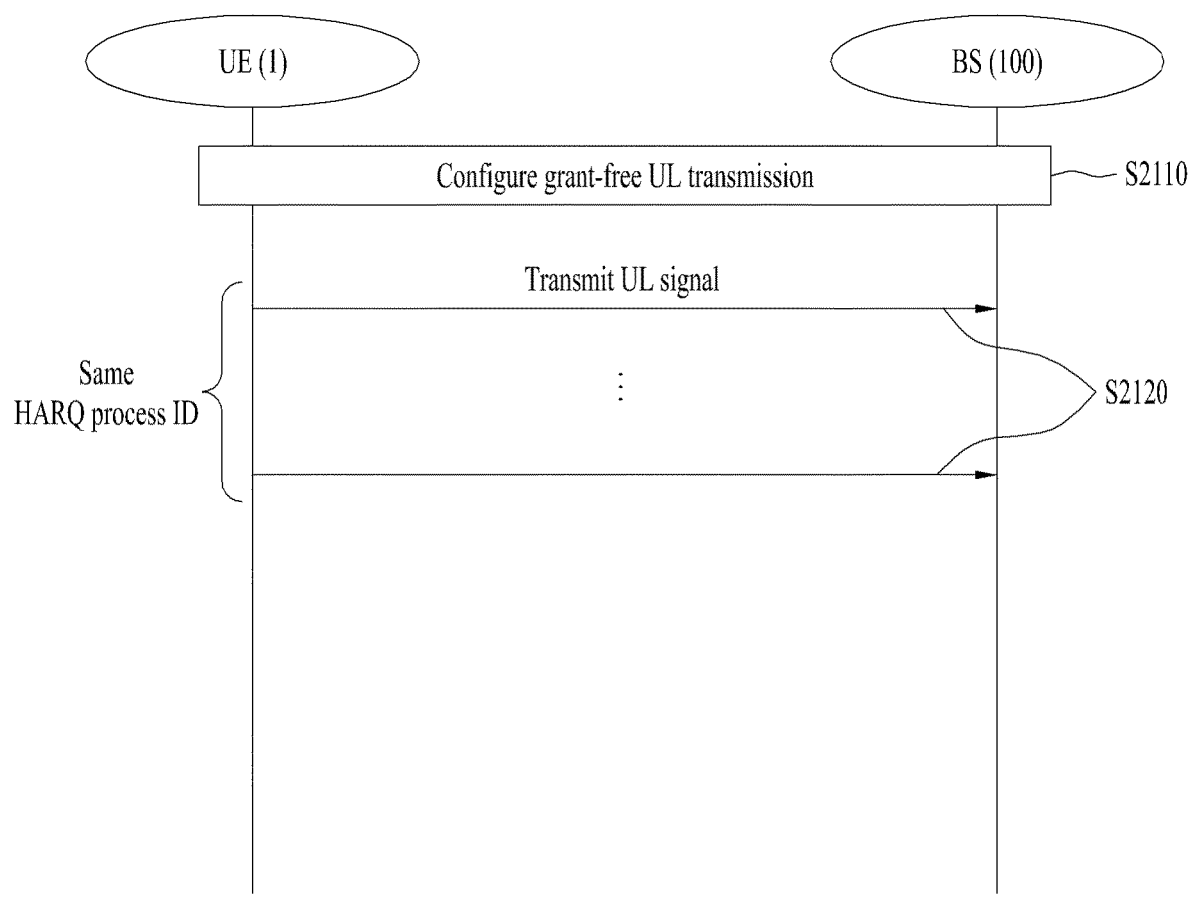
FIG. 21 schematically illustrate operation between a UE and a BS according to an embodiment of the present invention.

FIG. 21 schematically illustrate operation between a UE and a BS according to an embodiment of the present invention.

As shown in FIG. 12, the BS 100 configures grant-free UL transmission (or grant-free transmission) for the UE 1 [S2110].

In this case, the configuration may be performed through separate RRC signaling.

Here, the grant-free UL transmission may mean that the UE transmits a UL signal on resources configured by the BS without separate dynamic signaling (e.g., UL grant).

Next, the UE 1 repeatedly transmits a UL signal one or more times to the BS 100 [S2120]. In this case, the repeated transmission of the UL signal may be performed by using resources configured by the BS within a predetermined period.

In this case, the UL signal repeatedly transmitted one or more times within the predetermined time may be configured to correspond to the same Hybrid Automatic Repeat reQuest (HARQ) process identity (ID).

In addition, if the number of repetitions is set to K, (1) the UE may repeat the transmission K times within the predetermined period, or (2) if the predetermined period expires, the UE may terminate repeating the transmission.

Moreover, the UE may obtain acknowledgement information for the UL signal from the BS.

In this case, the UE may obtain the acknowledgement information for the UL signal as follows: 1) if acknowledgement information corresponding to the HARQ process ID is received from the BS, the UE obtains Non-ACKnowledgement (NACK) for the UL signal; and 2) if the acknowledgement information corresponding to the HARQ process ID is not received from the BS, the UE obtains ACKnowledgement (ACK) for the UL signal.

At this time, if the UE receives the NACK for the UL signal, the UE may perform retransmission of the UL signal.

Further, the acknowledgement information may be indicated by combining either or both of: <1> information indicating a specific value as resource allocation information for the UE; and <2> feedback information using an HARQ process which is not currently used.

Furthermore, the HARQ process ID is determined based on a resource on which initial transmission of the repeated transmission is performed (for example, based on the location of the resource where the initial transmission is or can be performed).

Additionally, a redundancy version corresponding to the UL signal repeatedly transmitted from the UE may vary depending on a pattern that is determined based on the resources allocated to the UE.

In response to the operation performed by the UE, the BS may receive the UL signal, which the UE repeatedly transmits one or more times, in step S2120

In this case, if the number of repetitions is set to K (where K is a natural number equal to or greater than 1) for the UE, the BS may receive, from the UE, the UL signal one or more times but K or less times depending on how the UE repeats the transmission within the predetermined time.

In addition, the BS may either transmit acknowledgement information corresponding to the HARQ process ID to the UE or discard the transmission according to whether the received UL signal is successfully decoded.

Specifically, when the BS successfully decodes the received UL signal, the BS does not transmit any acknowledgement information to the UE (that is, discards the transmission). On the contrary, when the BS fails to decode the received UL signal, the BS may transmit separate acknowledgement information to the UE. Thus, the acknowledgement information may be Non-ACKnowledgement (NACK) for the UL signal.

Alternatively, the BS may transmit acknowledgement information corresponding to the HARQ process ID to the UE according to whether the received UL signal is successfully decoded. In this case, the acknowledgement information may be indicated by combining either or both of: <1> information indicating a specific value as resource allocation information for the UE; and <2> feedback information using an HARQ process which is not currently used.

Since each embodiment of the above-described proposed method can be considered as one method for implementing the present invention, it is apparent that each embodiment can be regarded as a proposed method. In addition, the present invention can be implemented not only using the proposed methods independently but also by combining (or merging) some of the proposed methods. In addition, it is possible to define a rule that information on whether the proposed methods are applied (or information on rules related to the proposed methods) should be transmitted from the eNB to the UE through a predefined signal (e.g., physical layer signal, higher layer signal, etc.).

4. Device Configuration

Figure 22:
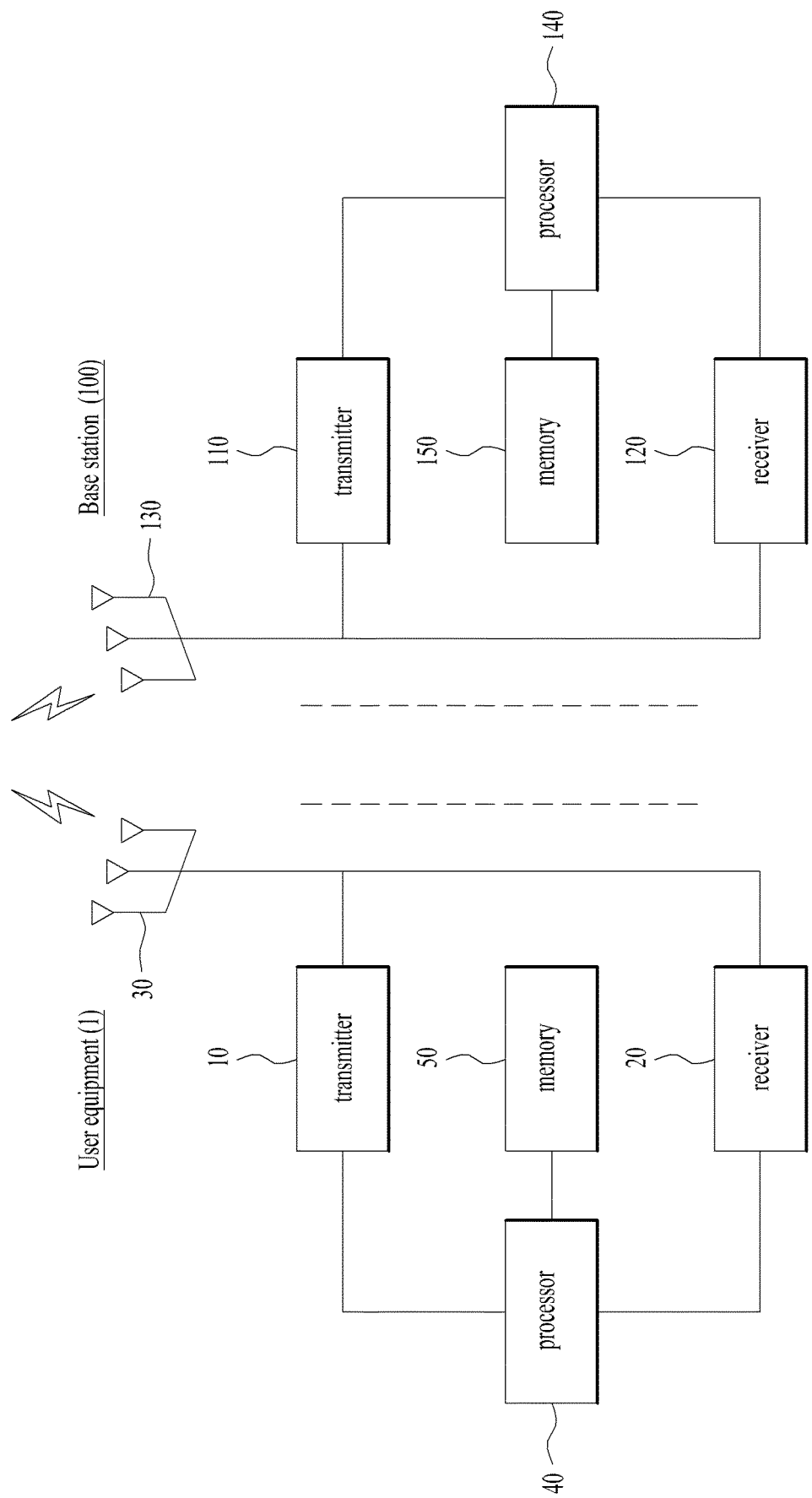
FIG. 22 illustrates the configurations of a UE and a BS for implementing the proposed embodiments.

FIG. 22 is a diagram illustrating configurations of a UE and a BS capable of being implemented by the embodiments proposed in the present invention. The UE and BS shown in FIG. 22 operate to implement the embodiments of the method for operating the UE and the BS.

The UE 1 may act as a transmission end on UL and as a reception end on DL. The BS (eNB or gNB) 100 may act as a reception end on UL and as a transmission end on DL.

That is, each of the UE and BS may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and BS may further include a processor 40 or 140 for implementing the afore-described embodiments of the present disclosure and a memory 50 or 150 for temporarily or permanently storing operations of the processor 40 or 140.

With the above-described configuration, the UE 1 repeatedly transmits an uplink signal one or more times on resources configured by the BS within a predetermined time through the processor 40 controlling the transmitter 10 when grant-free uplink transmission is configured by the BS. In this case, the uplink signal repeatedly transmitted one or more times within the predetermined time corresponds to the same Hybrid Automatic Repeat reQuest (HARQ) process identity (ID).

With the above-described configuration, the BS 100 receive, from the UE, an uplink signal one or more times on resources configured by the BS within a predetermined period through the processor 140 controlling the receiver 120 when grant-free uplink transmission is configured for the UE. In this case, the uplink signal repeatedly transmitted one or more times within the predetermined time corresponds to the same Hybrid Automatic Repeat reQuest (HARM) process identity (ID).

The Tx and Rx of the UE and the BS may perform a packet modulation/demodulation function for data transmission, a high-speed packet channel coding function, OFDM packet scheduling, TDD packet scheduling, and/or channelization. Each of the UE and the base station of FIG. 15 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method of operating by a User Equipment (UE) to communicate with a Base Station (BS) in a wireless communication system, the method comprising:
   determining a repetition factor K related to a number of times to perform an uplink transmission on consecutive time-domain resources configured by the BS;
   based on uplink transmission without dynamic scheduling configured by the BS, performing repeated uplink transmissions on consecutive time-domain resources within a time period among a plurality of time periods, wherein each time period is associated with a respective Hybrid Automatic Repeat reQuest (HARQ) process identity (ID); and
   based on an initial uplink transmission among the repeated uplink transmissions occurring with fewer than K consecutive time-domain resources remaining in the time period, terminating the repeated uplink transmissions at the end of the time period, before K repeated uplink transmissions have been performed,
   wherein each time period comprises a plurality of predetermined time-domain resources, and
   wherein each of the repeated uplink transmissions is performed on a respective one of the plurality of predetermined time-domain resources.

2. The method of claim 1, further comprising obtaining acknowledgement information for the repeated uplink transmissions.

3. The method of claim 2, wherein the obtaining the acknowledgement information for the repeated uplink transmissions comprises:
   based on receiving, from the BS, acknowledgement information corresponding to a HARQ process ID associated with the repeated uplink transmissions, obtaining Non-ACKnowledgement (NACK) for the repeated uplink transmissions; and
   based on not receiving, from the BS, the acknowledgement information corresponding to the HARQ process ID associated with the repeated uplink transmissions, obtaining ACKnowledgement (ACK) for the repeated uplink transmissions.

4. The method of claim 3, further comprising, based on receiving the NACK for the repeated uplink transmissions, performing retransmission of the repeated uplink transmissions.

5. The method of claim 2, wherein the acknowledgement information is indicated by combining either or both of information indicating a specific value as resource allocation information for the UE and feedback information using an HARQ process which is not currently used.

6. The method of claim 1, wherein a HARQ process ID associated with the repeated uplink transmissions is determined based on a time-domain resource that the initial uplink transmission is performed.

7. The method of claim 1, wherein a redundancy version for the repeated uplink transmissions is determined based on each transmission occasion for the repeated uplink transmissions.

8. A method of operating by a Base Station (BS) to communicate with a User Equipment (UE) in a wireless communication system, the method comprising:

based on uplink transmission without dynamic scheduling configured for the UE, receiving, from the UE, repeated uplink transmissions on consecutive time-domain resources within a time period among a plurality of time periods, wherein each time period is associated with a respective Hybrid Automatic Repeat reQuest (HARQ) process identity (ID), and wherein the reception of the repeated uplink transmissions are performed until the end of the time period, based on an initial uplink transmission among the repeated uplink transmissions occurring with fewer than K consecutive time-domain resources remaining in the time period, wherein K is a repetition factor related to a number of times to perform an uplink transmission on consecutive time-domain resources configured by the BS, wherein each time period comprises a plurality of predetermined time-domain resources, and wherein each of the repeated uplink transmissions occurs on a respective one of the plurality of predetermined time-domain resources.

9. The method of claim 8, further comprising:

based on whether the repeated uplink transmissions are successfully decoded, (i) transmitting acknowledgement information corresponding to the HARQ process ID associated with the repeated uplink transmissions with respect to the UE, or (ii) dropping a transmission of the acknowledgement information.

10. The method of claim 9, wherein the acknowledgement information corresponds to Non-ACKnowledgement (NACK) for the repeated uplink transmissions.

11. The method of claim 9, further comprising, based on the BS transmitting the acknowledgement information, receiving, from the UE, a signal that is retransmitted for the repeated uplink transmissions.

12. The method of claim 8, further comprising:

transmitting, to the UE, acknowledgement information corresponding to the HARQ process ID based whether the repeated uplink transmissions are successfully decoded, wherein the acknowledgement information is indicated by at least one of (i) information indicating a specific value as resource allocation information for the UE, or (ii) feedback information using an HARQ process which is not currently used.

13. The method of claim 8, wherein the HARQ process ID associated with the repeated uplink transmissions is determined based on a time-domain resource that the UE performs the initial uplink transmission.

14. The method of claim 8, wherein a time-domain resource that the initial uplink transmission is performed is determined based on a specific resource index of the time period.

15. A communication device configured to transmit and receive signals to and from a Base Station (BS) in a wireless communication system, the communication device comprising:

at least one processor; and at least one memory operably coupled with the at least one processor and storing instructions that, when executed, cause the at least one processor to perform operations comprising:

determining a repetition factor K related to a number of times to perform an uplink transmission on consecutive time-domain resources configured by the BS;

based on uplink transmission without dynamic scheduling configured by the BS, performing repeated uplink transmissions on consecutive time-domain resources within a time period among a plurality of time periods, wherein each time period is associated with a respective Hybrid Automatic Repeat reQuest (HARQ) process identity (ID); and based on an initial uplink transmission among the repeated uplink transmissions occurring with fewer than K consecutive time-domain resources remaining in the time period, terminating the repeated uplink transmissions at the end of the time period, before K repeated uplink transmissions have been performed, wherein each time period comprises a plurality of predetermined time-domain resources, and wherein each of the repeated uplink transmissions is performed on a respective one of the plurality of predetermined time-domain resources.

16. The method of claim 1, wherein the initial uplink transmission occurs after an initial time-domain resource of the time period.

17. The method of claim 1, wherein the plurality of predetermined time-domain resources in each time period are configured by the BS.

18. The method of claim 8, wherein the plurality of predetermined time-domain resources in each time period are configured by the BS.

19. The communication device of claim 15, wherein the plurality of predetermined time-domain resources in each time period are configured by the BS.

* * * * *